United States Patent
Kelly

(10) Patent No.: US 9,047,564 B1
(45) Date of Patent: *Jun. 2, 2015

(54) USER INTERFACE FOR ENTERING AND VIEWING QUANTITATIVELY WEIGHTED FACTORS FOR DECISION CHOICES

(71) Applicant: Patrick Laughlin Kelly, Berkeley, CA (US)

(72) Inventor: Patrick Laughlin Kelly, Berkeley, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/188,002

(22) Filed: Feb. 24, 2014

Related U.S. Application Data

(60) Continuation of application No. 13/910,746, filed on Jun. 5, 2013, now Pat. No. 8,700,558, which is a division of application No. 12/548,267, filed on Aug. 26, 2009, now Pat. No. 8,484,149, which is a continuation-in-part of application No. 12/041,789, filed on Mar. 4, 2008, now Pat. No. 8,234,231.

(60) Provisional application No. 61/092,410, filed on Aug. 28, 2008, provisional application No. 60/905,264, filed on Mar. 6, 2007.

(51) Int. Cl.
*G06F 15/18* (2006.01)
*G06N 5/02* (2006.01)
*G06F 3/0484* (2013.01)

(52) U.S. Cl.
CPC ............ *G06N 5/022* (2013.01); *G06F 3/04842* (2013.01)

(58) Field of Classification Search
CPC ........................................................ G06N 5/04
USPC ............................................................ 706/60
See application file for complete search history.

(56) References Cited

U.S. PATENT DOCUMENTS

| | | | |
|---|---|---|---|
| 6,070,149 A | 5/2000 | Tavor et al. | |
| 7,036,090 B1 | 4/2006 | Nguyen | |
| 2006/0078867 A1 | 4/2006 | Penny et al. | |
| 2006/0286537 A1 | 12/2006 | Mandella et al. | |
| 2007/0011185 A1 | 1/2007 | John | |
| 2007/0231780 A1 | 10/2007 | Shulman | |
| 2008/0134053 A1 | 6/2008 | Fischer | |

OTHER PUBLICATIONS

"PhDs.org: Find the Graduate School That's Right for You", retrieved from http://graduate-school.phds.org on Jul. 15, 2008.

*Primary Examiner* — Jeffrey A Gaffin
*Assistant Examiner* — Ola Olude Afolabi
(74) *Attorney, Agent, or Firm* — Raubvogel Law Office

(57) ABSTRACT

An interface facilitates user input of quantitatively weighted recommendations, including weighted factors in support of decision choices. A user input mechanism allows a user to specify a factor in support of a choice, and to specify values for quantitative parameters associated with the factor along two or more axes. An overall quantitative weight for the factor is generated based on the specified quantitative parameters. In one embodiment, a graphical user interface is presented, wherein the user specifies the values for the weighting parameters by dragging a movable indicator within an N-dimensional space. Each axis of the N-dimensional space corresponds to a weighting parameter. An overall quantitative weight for the factor is calculated, for example, as the product of the specified values along each of the axes. A visual indication of this calculation is presented, so as to provide an intuitive sense of the overall weight assigned to the factor.

32 Claims, 15 Drawing Sheets

USER INTERFACE FOR ENTERING AND VIEWING QUANTITATIVELY WEIGHTED FACTORS FOR DECISION CHOICES

CROSS-REFERENCE TO RELATED APPLICATIONS

The present patent application claims priority as a continuation of U.S. Utility patent application Ser. No. 13/910,746, filed Jun. 5, 2013, for "User Interface for Entering and Viewing Quantitatively Weighted Factors for Decision Choices", which is incorporated herein by reference.

U.S. Utility patent application Ser. No. 13/910,746 claimed priority as a divisional of U.S. Utility patent application Ser. No. 12/548,267, filed Aug. 26, 2009, for "User Interface for Entering and Viewing Quantitatively Weighted Factors for Decision Choices", which is incorporated herein by reference.

U.S. Utility patent application Ser. No. 12/548,267 claimed priority from U.S. Provisional Patent Application Ser. No. 61/092,410, filed Aug. 28, 2008, for "Interface to Provide Recommendations and/or Adjust Weighting of Reasons Entering into a Decision", which is incorporated herein by reference.

U.S. Utility patent application Ser. No. 12/548,267 also claimed priority as a continuation-in-part of U.S. Utility patent application Ser. No. 12/041,789, filed Mar. 4, 2008, for "Interface to Provide Recommendations and/or Adjust Weighting of Reasons Entering into a Decision", which is incorporated herein by reference, and which in turn claimed priority from U.S. Provisional Patent Application Ser. No. 60/905,264, filed Mar. 6, 2007, for "Method of Generating Decision Processes Using Input From Users", which is incorporated herein by reference.

FIELD OF THE INVENTION

The present invention relates to systems and methods for enabling collaborative decision-making, and more particularly to a user interface for entering and viewing quantitatively weighted factors for decision choices.

DESCRIPTION OF THE RELATED ART

In making decisions, it is often useful to solicit and obtain the opinions of others. Many people seek advice from several people before making a decision, particularly when the decision involves an important or expensive choice, or when the decision is irrevocable once made. For example, someone who is considering buying a new car may ask for advice from several people they know, particularly from those who have bought a car that the person is considering.

Individuals often find it difficult to obtain enough information to feel confident about their decision. They may not know enough people who have expertise in the required area, or they may not have the time to ask enough people, or they may not want to burden others with their questions. Online resources, such as forums and newsgroups, are available, but it may be difficult to get useful, practical advice from such sources because of their unstructured nature; often, such sources provide no clear paradigm for contributing advice regarding a decision that has a fixed number of options. It may also be time-consuming to locate a relevant online forum and to sift through a large number of postings to find those that appear to be relevant, and then to aggregate the information in the postings so as to extract useful advice.

In addition, advice and guidance from such sources often ignore the particular preferences and needs of the individual seeking the advice. For example, a compact car might be suitable for a single student, but might not be suitable for a large family with four children. Many sources of information do not adequately take into account individual preferences and needs, so that the advice they provide may not apply to the individual making the decision.

In many situations, social networks can provide a forum in which advice and opinions can be shared. However, such networks often do not provide a robust mechanism for providing quantitative information such as numerical scores while including multidimensional justifications for such scores. When scores are provided, they often fail to reflect multivariate or multidimensional scoring paradigms. In addition, such rudimentary scoring systems often fail to indicate, to the person seeking advice, what factors came into play in arriving at a score. It is often difficult, then, for the person seeking advice to ascertain whether a score reflects those considerations and factors that are important to him or her. Accordingly, the person seeking advice may not know whether or not to heed particular advice, or how to weigh one recommendation against another.

What is needed is a system and method that allows a user to indicate a multidimensional justification for a submitted score, such as a score reflecting an opinion with respect to a decision to be made. What is further needed is a system and method for presenting an easy-to-use interface for entering and viewing weighting factors for recommendations. What is further needed is a system and method for presenting a user interface for soliciting and obtaining advice from users in a systematic and structured way that aggregates the advice to generate useful recommendations. What is further needed is a system and method for presenting a user interface that provides a visual representation of a mathematical function for combining multiple variables to develop weighting factors for recommendations. What is further needed is a system and method for presenting such a user interface while avoiding the disadvantages of the prior art.

SUMMARY OF THE INVENTION

In various embodiments, the present invention provides an interface to facilitate user input of quantitatively weighted recommendations, including weighted factors in support of decision choices. A user input mechanism is provided wherein a user can specify a factor in support of a choice, and can specify values for quantitative parameters associated with the factor along two or more axes. An overall quantitative weight for the factor is generated based on the specified quantitative parameters.

In one embodiment, a graphical user interface is presented, wherein the user specifies the values for the weighting parameters by dragging a movable indicator within an N-dimensional space. Each dimension, or axis, of the N-dimensional space corresponds to a weighting parameter. An overall quantitative weight for the factor is calculated, for example, as the product of the specified values along each of the axes. A visual indication of this calculation is presented, so as to provide an intuitive sense, to the user as well as to other users, of the overall weight assigned to the factor.

For example, in an embodiment where factor weights are based on two weighting parameters, the weight can be calculated as the product of the two parameter values. According to the techniques of the present invention, a user can specify weights by dragging a movable indicator in a two-dimensional space; each of the two axes corresponds to one of the weighting parameters. As the user drags the movable indicator, a rectangle is shown, having width corresponding to the position of the movable indicator along a horizontal axis, and having height corresponding to the position of the movable indicator along a vertical axis. Since the overall quantitative weight is determined by the product of the two parameter values, this overall weight corresponds directly to the area of the rectangle. In one embodiment, the rectangle is dynamically resized as the user moves the movable indicator. Thus, at any given moment, the user can easily see the overall quantitative weight as an intuitively depicted visual indicator in the form of a dynamically resizable rectangle.

In another embodiment where factor weights are based on three weighting parameters, the weight can be calculated as the product of the three parameter values. In such an embodiment, a user can specify weights by dragging a movable indicator in a three-dimensional space; each of the three axes corresponds to one of the weighting parameters. As the user drags the movable indicator, a cube, or a representation of a cube, is shown, having dimensions along three axes corresponding to the position of the movable indicator along the three axes. If a true three-dimensional display device is not available, a two-dimensional projection or representation of the cube can be portrayed. Since the overall quantitative weight is determined by the product of the three parameter values, this overall weight corresponds directly to the volume of the cube. In one embodiment, the cube is dynamically resized as the user moves the movable indicator. Thus, at any given moment, the user can easily see the overall quantitative weight as an intuitively depicted visual indicator in the form of a dynamically resizable cube.

In one embodiment, the visual N-dimensional representation of overall quantitative weight can be used for both input and output. Thus, in a collaborative recommendation system wherein several users can provide factors for an advice-seeker, an interactive environment is provided for the users to drag a movable indicator and thereby specify their factors and parameter weights in N dimensions. In addition, the advice-seeker can choose to view these factors and parameter weights in N dimensions via a visual N-dimensional representation that may or may not be interactive. In one embodiment, the advice-seeker can adjust factors and weights by moving the movable indicators from the positions initially specified by the individual users. The visual N-dimensional representation of overall quantitative weight provides an intuitive mechanism by which a user can see how each contributing variable contributes to overall parameter weight; for example, in a two-dimensional implementation the area of a rectangle defined by the two variables corresponds to the overall weight.

In one embodiment, representations of factors and parameter weights for a plurality of users can be displayed on the same set of axes. In this manner, comparisons and/or aggregations of factors can be presented; in addition, users can use the factors and weights provided by others as a guide when inputting their own factors and weights.

BRIEF DESCRIPTION OF THE DRAWINGS

The accompanying drawings illustrate several embodiments of the invention and, together with the description, serve to explain the principles of the invention. One skilled in the art will recognize that the particular embodiments illustrated in the drawings are merely exemplary, and are not intended to limit the scope of the present invention.

DETAILED DESCRIPTION OF THE EMBODIMENTS

In one embodiment, the present invention is implemented in the context of a system and method for soliciting and obtaining advice and recommendations from a plurality of users, such as in the context of a collaborative network or social network implemented across a plurality of computing devices. U.S. Utility patent application Ser. No. 12/041,789, filed Aug. 28, 2008, for "Interface to Provide Recommendations and/or Adjust Weighting of Reasons Entering into a Decision", which is incorporated herein by reference, describes systems and methods for a plurality of users to help an advice-seeker make a decision among two or more choices. According to the techniques described herein, users can create lists of reasons, or factors, in favor of one or more of the choices. Numeric weights can be assigned to each factors; the sum of the numeric weights of factors for each choice yields a score for that choice. Opinions of various users can be aggregated by generating sums of the numeric weights, and the result can be presented to the advice-seeker so as to aid him or her in making a decision among the choices.

As described in the above-referenced patent application, the collaborative advice-sharing paradigm can be implemented in a social network or other construct involving disparately located participants communicating via a computing network such as the Internet. A user interface for providing advice and for viewing advice of others can be presented, for example, via web pages that are transmitted to client machines via well-known network protocols such as hypertext transfer protocol (HTTP) and transmission control protocol/Internet protocol (TCP/IP). Client machines can present the user interface via a browser such as, for example, Internet Explorer available from Microsoft Corporation of Redmond, Wash. Thus, an advice-seeker can post a question related to a decision to a website; visitors to the website can then contribute their recommendations in the form of factors to consider in deciding between the possible choices. In one embodiment, both the advice-seeker and other users may post new factors and weights in support of choices.

System Architecture

Figure 1:
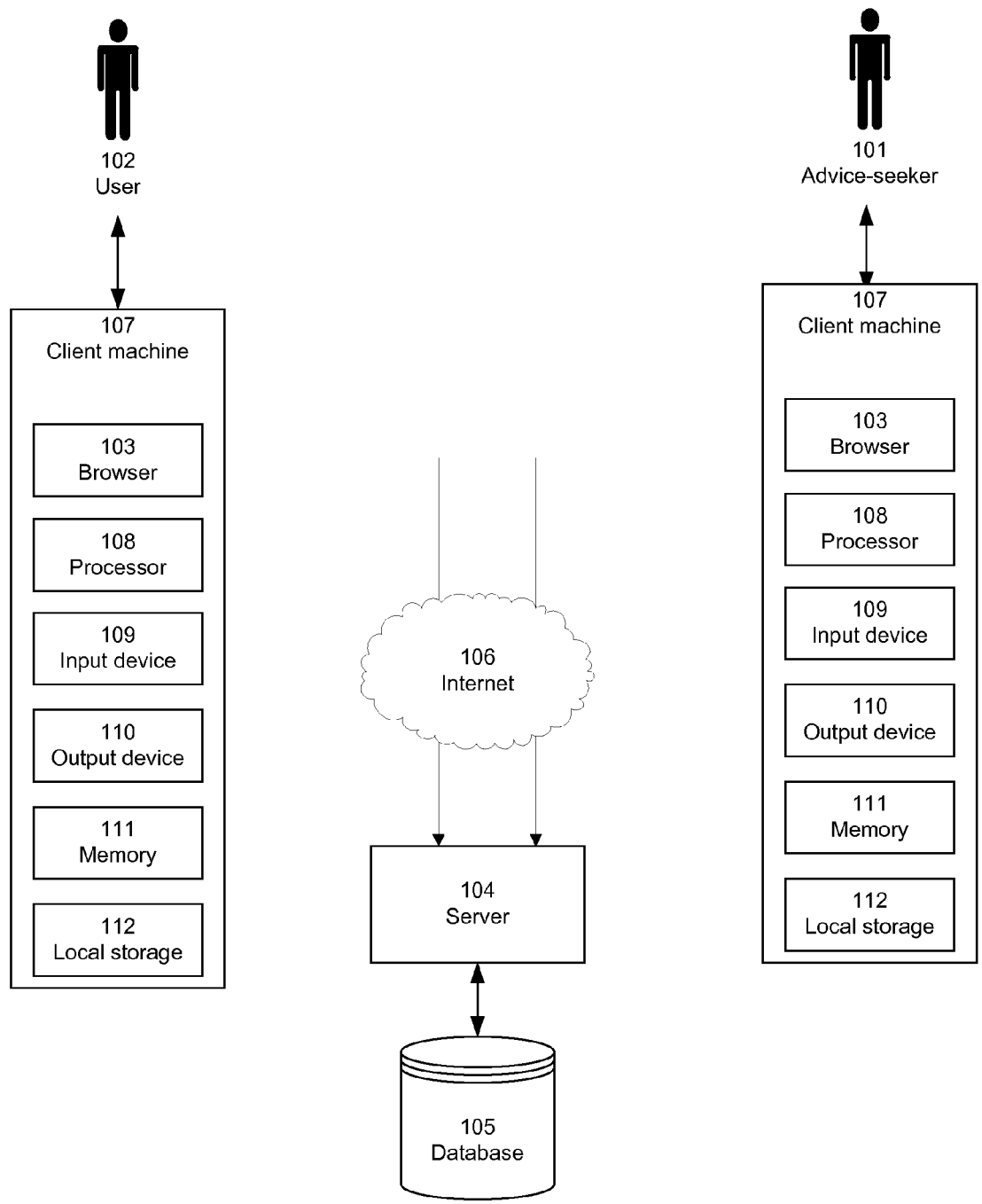
FIG. 1 is a block diagram depicting an architecture for practicing the present invention according to one embodiment.

Referring now to FIG. 1, there is shown a block diagram depicting an architecture for practicing the present invention according to one embodiment. In one embodiment, the invention is implemented in a client/server environment, wherein some components are implemented in a central server 104, while the advice-seeker 101 and users 102 interact with the system via client machines 107. Client machines 107 may communicate with server 104 according to any known networking paradigm, including for example TCP/IP communication over the Internet 106. A database 105 is provided for storing working data such as questions, responses, and the like.

In one embodiment, each client machine 107 can be a personal computer, computing device, or other electronic device such as a kiosk, telephone, cellular telephone, handheld computer, personal digital assistant, or the like. Each client machine 107 includes, in one embodiment: processor 108; memory 111; local storage 112; input device 109 such as a keyboard, mouse, touchpad, or the like; output device 110 such as a display screen; and other hardware components as are well known for computing devices and/or other electronic devices. Each client machine 107 may run an operating system such as Microsoft Windows Vista, available from Microsoft Corporation of Redmond, Wash.

In one embodiment, browser software 103 runs on each client machine 107 enabling user 102 and advice-seeker 101 to view content and interact with web pages available on the World Wide Web and delivered to client machine 107 via the Internet 106. One example of browser 103 is Microsoft Internet Explorer, available from Microsoft Corporation of Redmond, Wash. In one embodiment, the system and method of the present invention is implemented using web pages and/or web applications delivered to client machine 107 for viewing and interaction via browser 103.

In one embodiment, the client-side aspects of the present invention are implemented using Asynchronous JavaScript and XML (AJAX), which allow for improved responsiveness in user interaction.

In other embodiments, users 102 and advice-seekers 101 interact with the system via other means, such as by a voice-activated telephone interface, or the like. In other embodiments, the invention can be implemented as a standalone system, where no communication with outside components is needed.

Method of Operation

Figure 2:
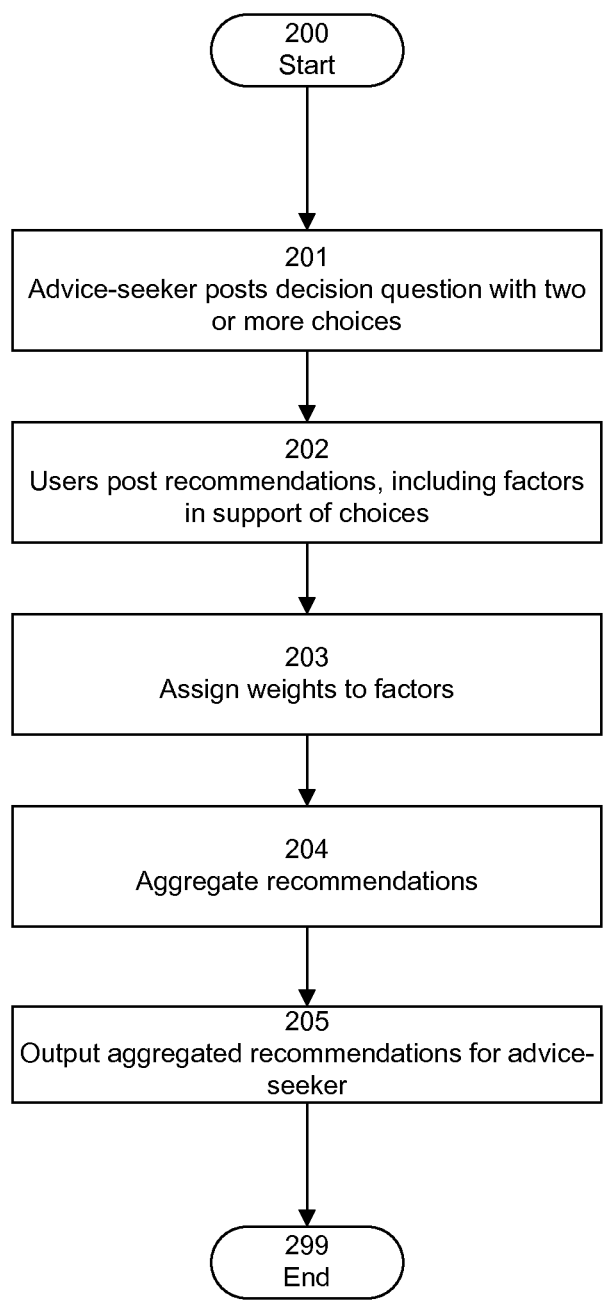
FIG. 2 is a flowchart depicting a method of practicing the present invention according to one embodiment.

Referring now to FIG. 2, there is shown a method of practicing the present invention according to one embodiment. An advice-seeker 101 is looking for assistance in making a decision. The advice-seeker 101 posts 201 a decision question, for example by entering text in a set of input fields on a web page. In one embodiment, the present invention is implemented via a web page that provides a mechanism for structured entry of a decision question. For illustrative purposes, the decision question is assumed to have two possible choices, although the invention can accommodate decision questions having any number of possible choices, as described in more detail below.

In one embodiment, prior to the advice-seeker 101 posting a decision question, he or she can browse a list of previously posted questions and/or enter a search query to find previously posted questions on a particular topic.

In one embodiment, natural language processing is performed on an entered search query so as to identify previously posted decision questions that are in some way related to the subject matter for which the advice-seeker 101 wants assistance. This can be accomplished through keyword matching, natural language algorithm, or the like. If a matching decision question has been posted previously, the system can present the previously posted question(s) to the advice-seeker 101 so as to allow the advice-seeker 101 to review associated secondary questions and obtain advice with respect to the previously posted question(s). The advice-seeker 101 can be prompted to provide input as to whether the previously posted question(s) is a good match to the query posted by the advice-seeker 101. Such a record of verification can be retained for use in future search queries.

If the advice-seeker 101 is not able to find a previously posted decision question that is on point, he or she can enter a new decision question. The decision question can be entered in a structured fashion, with separate input fields for each component of the question. Alternatively, the advice-seeker 101 can enter the question in a text field, and the system can use natural language processing to identify the preamble and the two (or more) choices specified in the question.

Once it has been parsed, the decision question is stored in the database 105.

Subsequently, other users 102 can view the decision question and post 202 recommendations including factors in support of one or more of the choices. The advice-seeker 101 can specify whether the decision question is viewable by anyone, or by a select group of individuals. For example, in one embodiment, the advice-seeker 101 may seek advice from a select group of friends, family or other contacts; thus, the decision question might be made available only to members of the select group. The group may be an arbitrary group, or it may be defined as those that have been granted access to the advice-seeker's 101 page on a social networking website such as Facebook.

In an embodiment where the decision question is viewable only by a select group of individuals, an email message or other communication can automatically be sent to those whose advice is sought. The email message can contain a link to the decision question at its posted location, and/or it might contain login authentication credentials enabling the recipient to access the posting, view the decision question, and provide advice.

In one embodiment, the user 102 indicates, for each factor, which of the choices should be favored based on the factor. For example, in a decision question involving a choice between two colleges, UCSC and Stanford, the user 102 might indicate that basketball is a factor, and might indicate that UCSC is recommended based on that factor.

Weights are assigned 203 to the factors. In one embodiment, the user 102 can specify a weight of the factor along some numeric scale. As described in more detail below, this weight can be determined based on values of component parameters along two or more axes. For example, the weight may be determined as a mathematical product (or other mathematical combination) of a suggested importance and a suggested rating for the factor. Importance can be an estimate as to how important the factor is to the decision, and the rating can be an estimate as to how strongly the factor favors one choice over the other. The importance can be an estimate of the importance for the advice-seeker 101, or it can be a personal assessment of the importance in the opinion of the user 102, or it can be specified and/or adjusted directly by the advice-seeker 101. The rating can be any quantitative assessment of the relative or absolute merit(s) of the decision choices judged on the basis of the factor.

In one embodiment, default values can be suggested for the component parameters, based for example on typical entries by other users 102. In another embodiment, the advice-seeker 101 can specify one or more of the component parameter values, for example to specify how important a factor is to him or her. The advice-seeker 101 can, in one embodiment, specify component parameter values in advance if desired, and can specify whether users 102 are free to change some or all of the values. In one embodiment, the advice-seeker 101 can adjust any or all of the values entered by users 102. Thus, for example, if a user 102 specifies a value for an importance factor, and the advice-seeker 101 disagrees with the specified value, the advice-seeker 101 can adjust the value entered by the user 102.

The component parameters may or may not be orthogonal (independent) with respect to one another. One mechanism for generating a factor weight is to multiply the values of the component parameters. Other mechanisms could be used as well.

In one embodiment, a visual representation of factor weight is dynamically generated by drawing a rectangle, cube or other shape delimited by the values of the component parameters. The particular shape can be a function of the number of component parameters, so that a weight based on two factors can be visually represented by a rectangle, while a weight based on three factors can be visually represented by a cube. In one embodiment, the visual representation is interactive, so that the user 102 can drag a movable element in order to change the values of the component parameters and thereby alter the overall weight. In one embodiment, the visual representation is updated in real-time, so that the user 102 can easily see the effect of his or her changes on the weight of the factor.

Once users 102 have posted their recommendations including factors, and factor weights have been assigned, the recommendations 204 can be aggregated, for example by generating a sum of factor weights in support of each choice. The aggregated recommendations are then output 205 for the benefit of the advice-seeker 101, for example as a score for each decision choice. In one embodiment, the advice-seeker 101 can adjust the aggregated recommendations, for example by adjusting factor weights, deleting factors, adding new factors, and the like; the score can automatically be adjusted based on these changes.

In one embodiment, one component parameter that is used in determining factor weight is the credibility of the user 102 that submitted the factor recommendation. Credibility can be ascertained, for example via a feedback mechanism, so that factors submitted by users 102 having higher levels of credibility are given greater strength than other factors.

If more than one user 102 submitted recommendations including the same factor, the advice-seeker 101 can view the recommendations submitted by each, and can select one or more of the recommendations. If a single recommendation is selected, the factor weight as specified by the user 102 can be used in the determination of a score, although the advice-seeker 101 may modify the weight if desired. If more than one recommendation is selected, their factor weights can be aggregated for use in the determination of a score. Alternatively, all of the relevant factors can be aggregated, for example by averaging. The advice-seeker 101 can also input his or her own indication of factor weights if desired.

Additional details on the infrastructure and process by which users 102 can post recommendations for the advice-seeker 101 are described in U.S. Utility patent application Ser. No. 12/041,789, filed Aug. 28, 2008, for "Interface to Provide Recommendations and/or Adjust Weighting of Reasons Entering into a Decision", which is incorporated herein by reference.

Factor Weight Input

As described above, in one embodiment, for each factor, a weight is specified. In one embodiment, the weight is a combination, such as a sum or product, of several individual qualitative values associated with parameters. For example, the weight can be generated by multiplying an importance by a rating.

In general, the advice-seeker 101 best knows the importance of each factor to him- or herself. Other users 102 can provide, using the input mechanism described herein, their judgment of factor importance as one of the parameters that determine the weight to be assigned to the factor. Advice-seekers 101 can modify factor importance if appropriate.

In one embodiment, a user 102 specifies parameter values using an interface that allows the user 102 to move an element on a display screen. The element can be moved along two or more axes, so as to enable specification of two or more parameter values. In one embodiment, a shape bound by the values specified by the element is dynamically drawn, so as to form an interactive user interface that allows the user 102 to easily see the overall weight being assigned to the factor by looking at the overall size (area, volume, or the like) of the drawn shape. In a two-dimensional scheme, a rectangle is drawn; in a three-dimensional scheme, a cube is drawn. Such shapes emphasize the fact that the overall weight is determined by multiplying the parameter values with one another.

Figure 3:
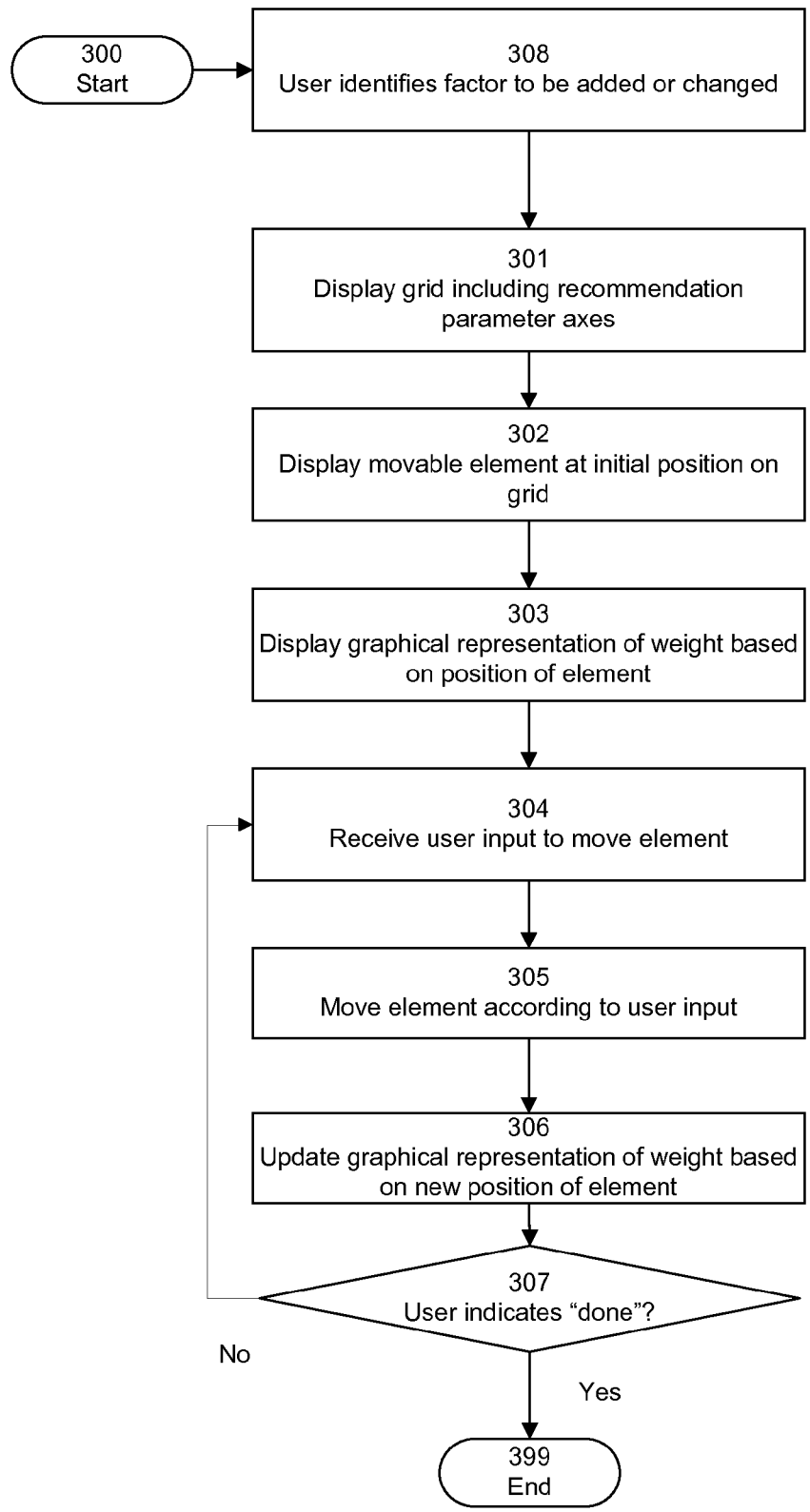
FIG. 3 is a flowchart depicting a method of entering a factor and weight according to one embodiment.

Referring now to FIG. 3, there is shown a method for entering a factor and weight according to one embodiment. In one embodiment, the method of FIG. 3 is performed as part of step 202 described above, wherein users 102 post recommendations, including factors in support of choices. In one embodiment, the steps of FIG. 3 are performed using a client/server interface, wherein, for example, a web page containing the factor and weight input interface is presented via browser 103 on client machine 107.

The user 102 identifies 308 a factor to be added or changed. The factor can be new, or it can be selected from a list of previously entered factors. A grid is displayed 301, including two or more axes corresponding to recommendation parameters. A movable user interface element is displayed 302 at an initial position on the grid, such as at the origin or at some default position, or at a position specified by the advice-seeker 101. A graphical representation of the weight of the factor, based on the current position of the user interface element, is displayed 303. For example, in an embodiment wherein the weight is determined based on two parameter values, the graphical representation displayed in step 303 can be a rectangle whose dimensions are defined by the horizontal and vertical position of the movable user interface element.

User input is received 304, for example via input device 109, to move the element. In various embodiments, the user input can take the form of cursor movement, pointer movement, mouse movement, keyboard input, contact with a touch-sensitive screen or touch-sensitive surface, or input provided via any other mechanism, including for example a trackball, joystick, voice control, five-way switch, control knob, or the like. The user interface element is moved 305 according to the user input, for example by being dragged from one position to another, and the graphical representation of the weight is updated 306 based on the new position of the element. In one embodiment, the graphical representation of the weight changes in real-time as the element is moved, so that the user 102 is presented with substantially instantaneous feedback to see the changes in overall weight resulting from the changes being performed. In one embodiment, a text-based display of the overall weight is also updated in real-time as the user 102 moves the element.

In one embodiment, a button or other activatable element is provided, to allow the user 102 to indicate that he or she is done making changes to the factor weight. Once the user 102 confirms that he or she is done 307, the method ends 399. If the user 102 provides additional input, the method returns to step 304. In this manner, the user 102 can continue to change the factor weight by adjusting parameter values for as long as he or she likes, until he or she is satisfied with the values and weight as depicted in the visual display.

In one embodiment, once the method of FIG. 3 is completed, the factor weight can be output, stored, and/or transmitted to another component of the system. Transmission and/or storage of the factor weight allows an advice-seeker 101 to later view the factor weight specified by a user 102 via the technique of FIG. 3. In addition, transmission and/or storage of the factor weight allows the specified factor weight to subsequently be aggregated or combined with other factor weights contributed by other users 102, so as to generate an aggregated recommendation for the advice-seeker 101.

The user interface described herein provides an interactive display that helps users 102 and advice-seekers 101 form immediate intuitive understanding of the independence of the parameter values with respect to one another, and of the process by which parameter values combine to form a weight for the factor. The interactive display of a shape (such as a rectangle or cube) defined by the specified parameter values helps reinforce these points. This visual representation of the weight provides an immediate intuitive understanding of how two parameter values (here (a) the relative rating and (b) the importance of the reason) combine to create a weight.

In addition, the use of the interactive display as described herein facilitates the display of multiple recommendations by different users 102 with respect to a particular factor. Each recommendation can be indicated by a designation at, for example, the coordinates corresponding to the parameter values specified by the corresponding user 102. These can be labeled and/or color coded, to enable the advice-seeker 101 to see which users assigned which values to the parameters.

One skilled in the art will recognize that other mathematical functions can be used to combine the parameter values. The use of a function wherein the parameter values are multiplied with one another is merely an example of one possible mechanism for combining parameter values to generate a factor weight.

One advantage of a bivariate (or multivariate) weighting scheme as enabled by the present invention is that it can combine expertise that is distributed between two different parties. For instance, an advice-seeker 101 may know how important a particular factor should be in making a decision, but may not accurately know how strongly, or in which direction, the factor points to one or the other of the decision choices. A user 102 providing a recommendation might have expertise allowing for a credible recommendation including strength of the rating for a factor, but might not know how important the factor is to the advice-seeker 101. The interface and architecture provided herein allows the two parties, the user 102 and the advice-seeker 101, to combine their expertise effectively, to derive a useful, accurate weight for the factor.

Example of User Interface

As described above, in one embodiment, the system and method of the present invention provide an intuitive mechanism and interactive display for reinforcing the use of multiplication to combine parameter values in obtaining a factor weight. A rectangle (for two dimensions), cube (for three dimensions), or other shape can be displayed, so that the area or volume of the shape indicates factor weight.

For illustrative purposes, the invention is described herein in terms of a two-dimensional embodiment, wherein a rectangle is dynamically drawn and wherein the area of the rectangle represents factor weight. This illustrative embodiment is not intended to be limiting, however, and one skilled in the art will recognize that the invention can be implemented in other ways, including three (or more) dimensional implementation.

In one embodiment, the user 102 can dynamically move an element on output device 110, such as a display screen. The element moves within a coordinate space defined, in one embodiment, by a Cartesian set of axes. While the element moves, the dimensions of the rectangle defined by the element's position is dynamically changed, so as to provide an accessible intuitive representation of how the parameters are independent from one another and how the factor weight is derived from the parameter values. In one embodiment, this feedback is provided in real-time by substantially instantaneously updating the dimensions of the rectangle as the element is moved.

In one embodiment, the weight corresponding to a factor is derived from two or more variables. For example, the weight may be derived from (a) the relative rating between the choices (if there are two) and (b) the importance of the factor, either to the user 102 or to the advice-seeker 101. For instance, a relative rating for basketball as a factor in deciding between Stanford and UC Santa Cruz (UCSC) might be indicated as strongly in Stanford's favor because of its superior team and stadium; on a scale of 1 to 10, the rating might be 10 in favor of Stanford over UCSC. However, basketball may not be especially important to the advice-seeker 101, so the importance of the factor might be only 2, on a scale of 1 to 10. Thus, a factor weight determined as the product of these two parameter values would be 2×10=20 out of a possible 100.

Figure 4:
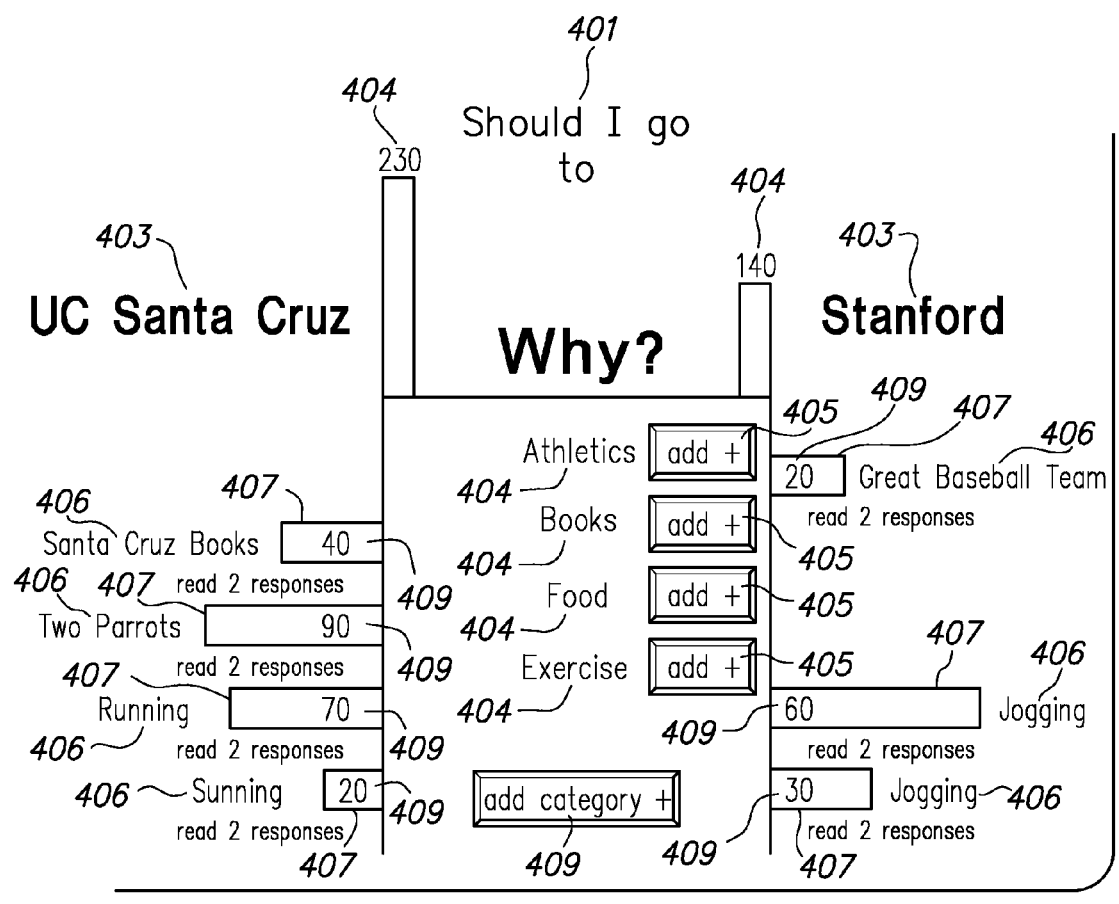
FIG. 4 is an example of a user interface for presenting a decision, according to one embodiment of the present invention.

Referring now to FIG. 4, there is shown an example of a user interface 400 for presenting a decision, according to one embodiment of the present invention. In one embodiment, user interface 400 is presented for a user 102 who is posting a recommendation for an advice-seeker 101. In the example, advice-seeker 101 is asking for advice on choosing between UC Santa Cruz (UCSC) and Stanford. The question presented 404 is "Should I go to . . . ?", and the choices 403 are UC Santa Cruz and Stanford.

Factors 406 affecting the decision are arranged in opposed columns, depending on which choice 403 they favor (based, for example, on recommendations previously provided by other users 102). In the example, factors 406 are separated into categories 405. For each choice, a weight is indicated, both as a numeric indicator 409 and a bar 407. These weights are generated, in one embodiment, by calculating a sum or average of weights for the factor as previously submitted by users 102.

In one embodiment, the user 102 can provide a recommendation on an existing factor by clicking on the bar 407 or on an icon (not shown) adjacent to the bar 407. The user 102 can add a new factor to an existing category by clicking on "add" button 405. The user 102 can add a category by clicking on "add category+" button 408.

Figure 5:
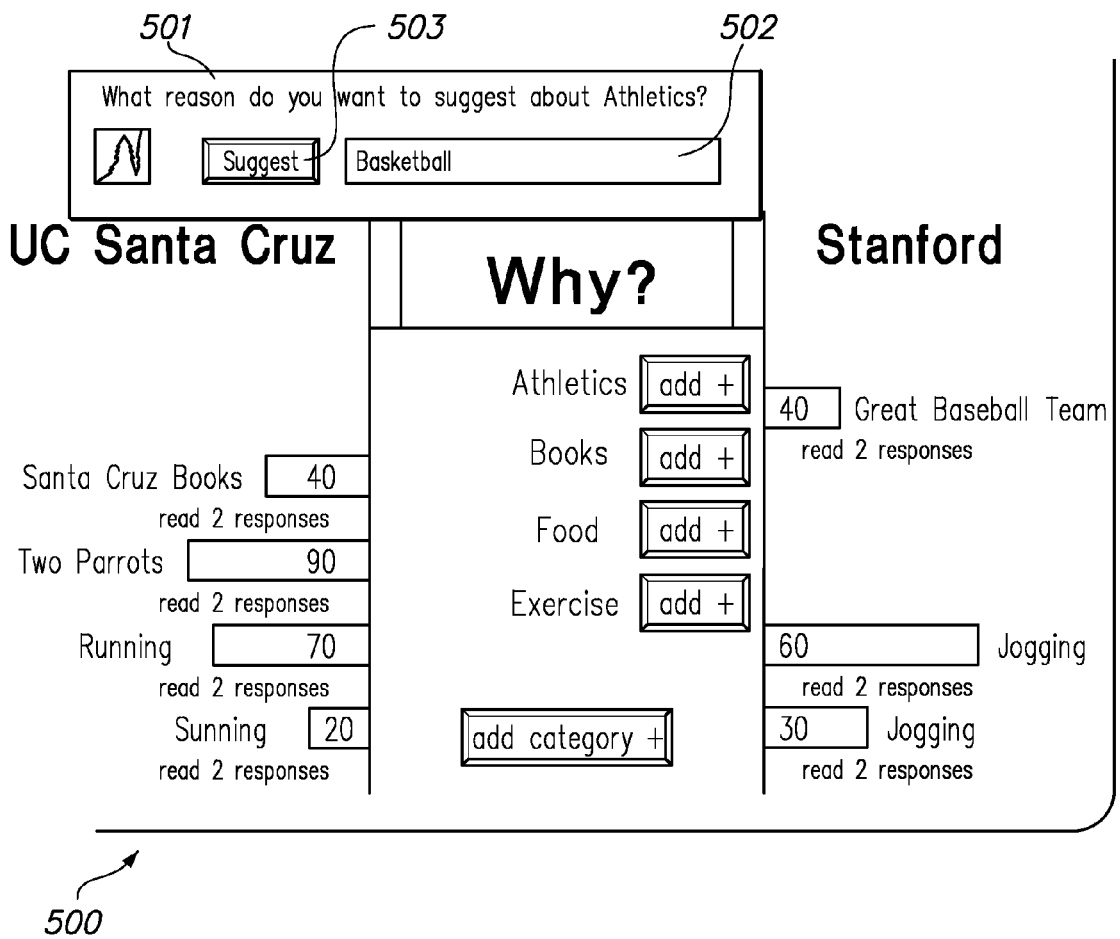
FIG. 5 is an example of a user interface for adding a factor, according to one embodiment of the present invention.

Referring now to FIG. 5, there is shown an example of a user interface 500 for adding a factor, according to one embodiment of the present invention. This screen is presented, in one embodiment, in response to the user 102 clicking on "add" button 405 next to the Athletics category in FIG. 4. A prompt 501 appears, inviting the user 102 to suggest a reason, or factor, in field 502. The user 102 types "Basketball" and clicks on Suggest button 503.

Figure 6:
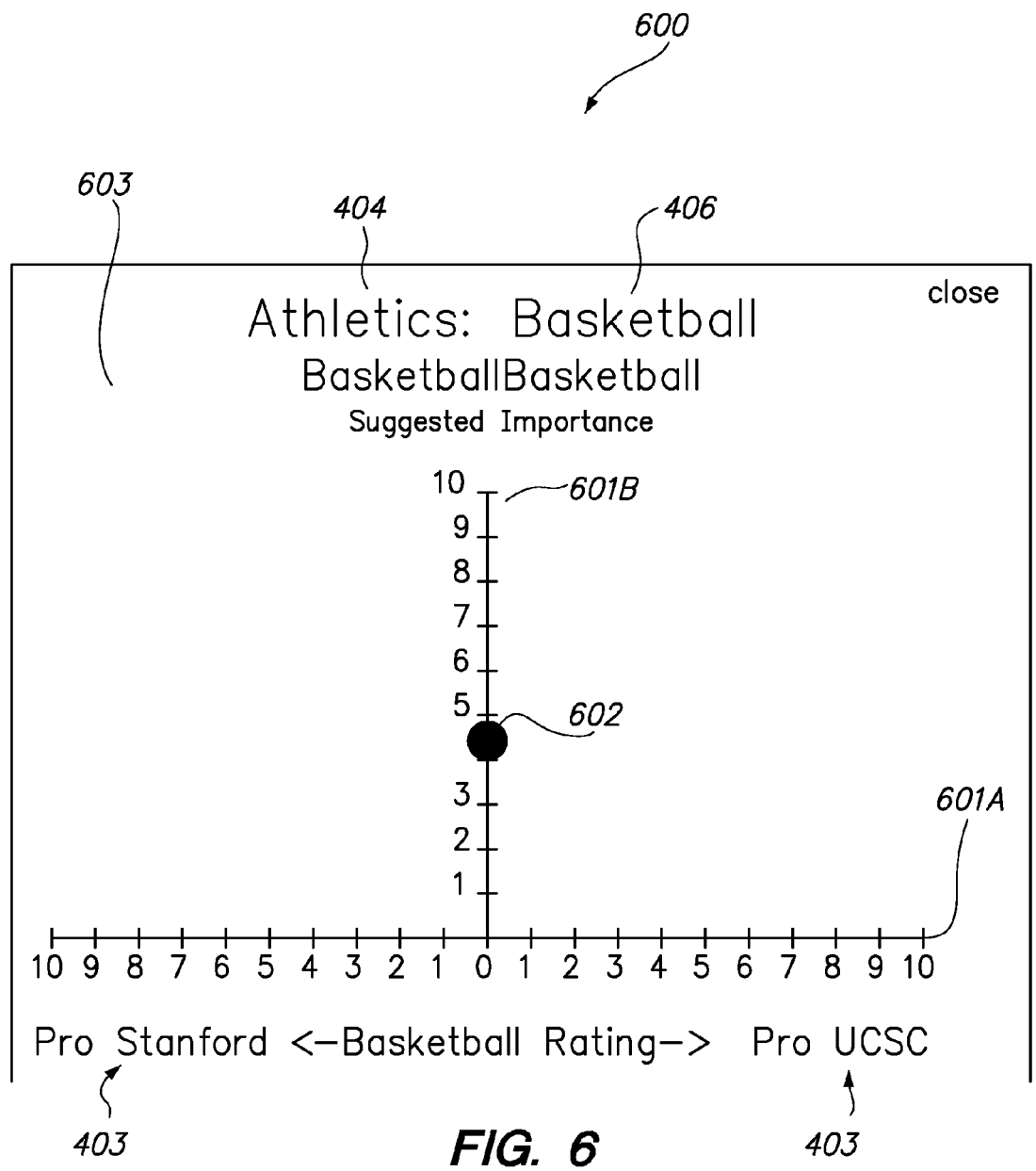
FIGS. 6 and 7 depict an example of a user interface for indicating a weight for a factor, according to one embodiment.

Next, the user 102 is invited to specify a weight for the new factor. Referring now to FIG. 6, there is shown an example of a user interface 600 for indicating a weight for a factor 406, according to one embodiment of the present invention. In one embodiment, the user interface 600 shown in FIG. 6 is presented after the user 102 has clicked on Suggest button 503. In one embodiment, the user interface 600 shown in FIG. 6 operates as described above in connection with FIG. 3.

In the example of FIG. 6, a user 102 is providing a recommendation as to which school to choose; the choices 403 of the decision are Stanford and UCSC. The user 102 has indicated basketball as a factor 406, within the category 404 of athletics.

A grid 603 is defined by a set of axes 601A, 601B. The horizontal axis 601A represents a rating signifying how strongly (in the user's 102 opinion) one of the choices 403 should be preferred based on the factor 406 (basketball). The vertical axis 601B represents the importance of basketball as a factor 406. A movable element 602, in this case a dot, is presented. The user 102 moves element 602 to the desired position within the grid 603 to indicate his or her opinion of the rating and importance of basketball as a factor 406.

In the example, the importance is initially set at 4.5 on a scale of 1 to 10; therefore, element 602 is shown at position 4.5 on the vertical axis 601B. The advice-seeker 101 may have specified this as the initial importance value for the factor, or the user 102 may have specified it. Alternatively, this may be a default or initial value for the importance.

In the example, the rating is initially set at 0 on a scale ranging from favoring Stanford by 10 to favoring UCSC by 10. Therefore, element 602 is shown at position 0 on the horizontal axis 601A. The advice-seeker 101 may have specified this as the initial rating for the factor, or the user 102 may have specified it. Alternatively, this may be a default or initial value for the rating.

Importance and rating can be set at any initial values within the grid 603, depending on preferences of the user 102 or advice-seeker 101, or on system-wide defaults or preferences that may be determined by an administrator. In one embodiment, an administrator can determine which parameters can be changed by the advice-seeker 101 and which can be changed by the user 102. In another embodiment, the advice-seeker 101 can specify whether and which parameters can be changed by the user 102. For example, the advice-seeker 101 may wish to specify the importance value, and may further specify that the user 102 cannot change the importance value.

Figure 7:
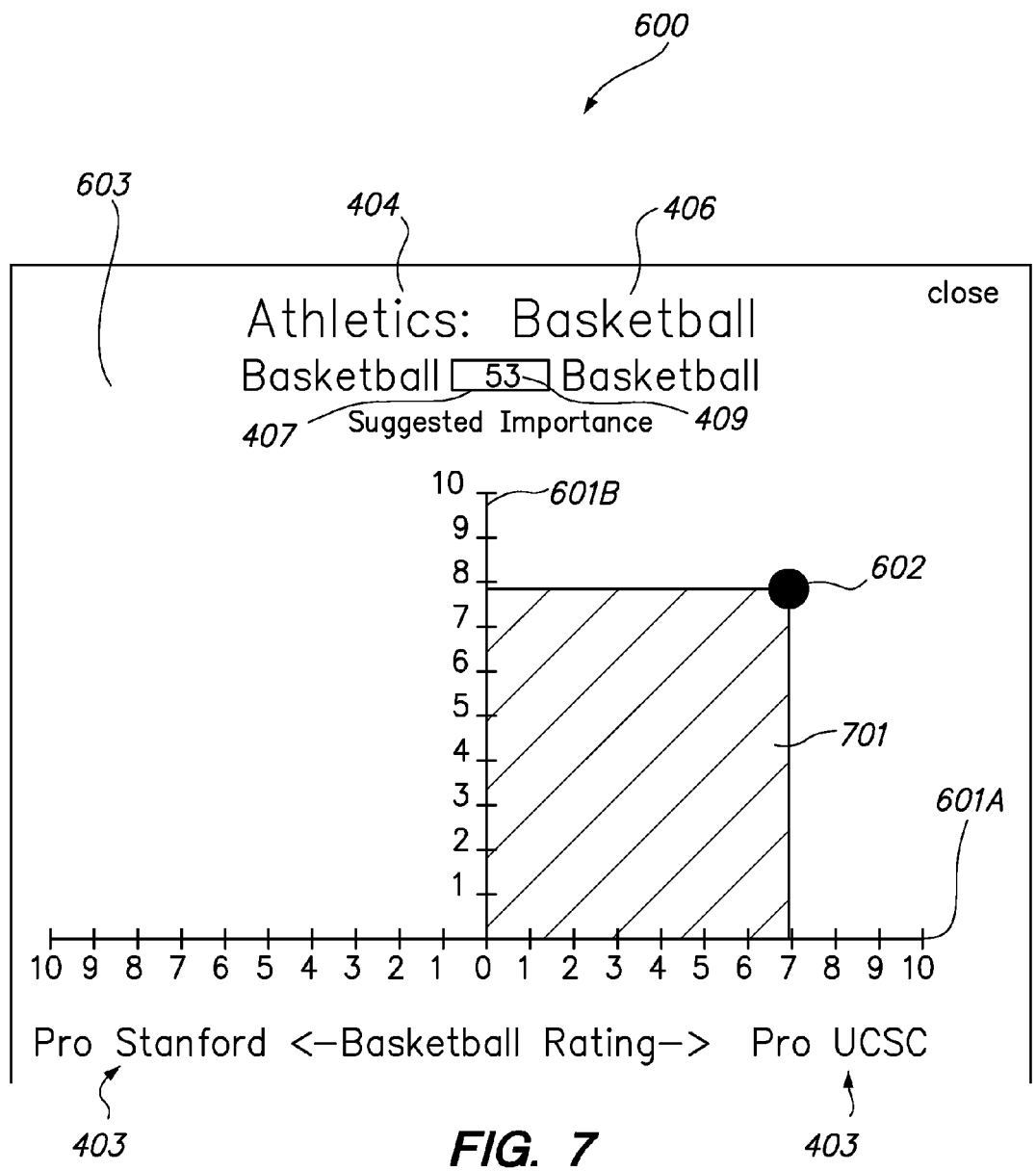

Referring now to FIG. 7, there is shown an example of a user interface 600 after the user 102 has moved element 602 to a new position. The new position of element 602 indicates that, in the opinion of the user 102, basketball has a rating of 6.8 in favor of UCSC, and an importance of 7.8. As the user 102 drags element 602 to its new position, a rectangle 701 is drawn, having width and height specified by the current position of element 602. The rectangle 701 can be shaded, as shown in the example of FIG. 7.

In this example, the weight of basketball as a factor 406 is determined as the mathematical product of the importance and the rating. Thus, the area of the rectangle 701 is a visual indication of the weight of the factor 406, since the size of the rectangle 701 varies in proportion to the product of the current values along the x and y axes. In one embodiment, the weight is also shown numerically 409 and as a bar 407 whose length changes according to the current weight.

The display and real-time updating of the rectangle 701 gives the user 102 an immediate understanding of how the weighting scheme operates, and helps the user see the effect of changes to the values along each axis 601. The user can understand, via the visual presentation of user interface 600, how movement of element 602 affects the weight associated with the factor 406.

In one embodiment, the user 102 can drag element 602 to any of a number of positions in the grid 603 before finalizing the recommendation. In one embodiment, the user 102 can indicate that he or she is ready to submit the recommendation, for example by clicking on an "OK" or "Done" button (not shown), or selecting from a menu (not shown), or by some other means.

In some embodiments, a field or other user interface element is provided (not shown) that allows the user 102 to include comments with his or her recommendation.

Figure 8:
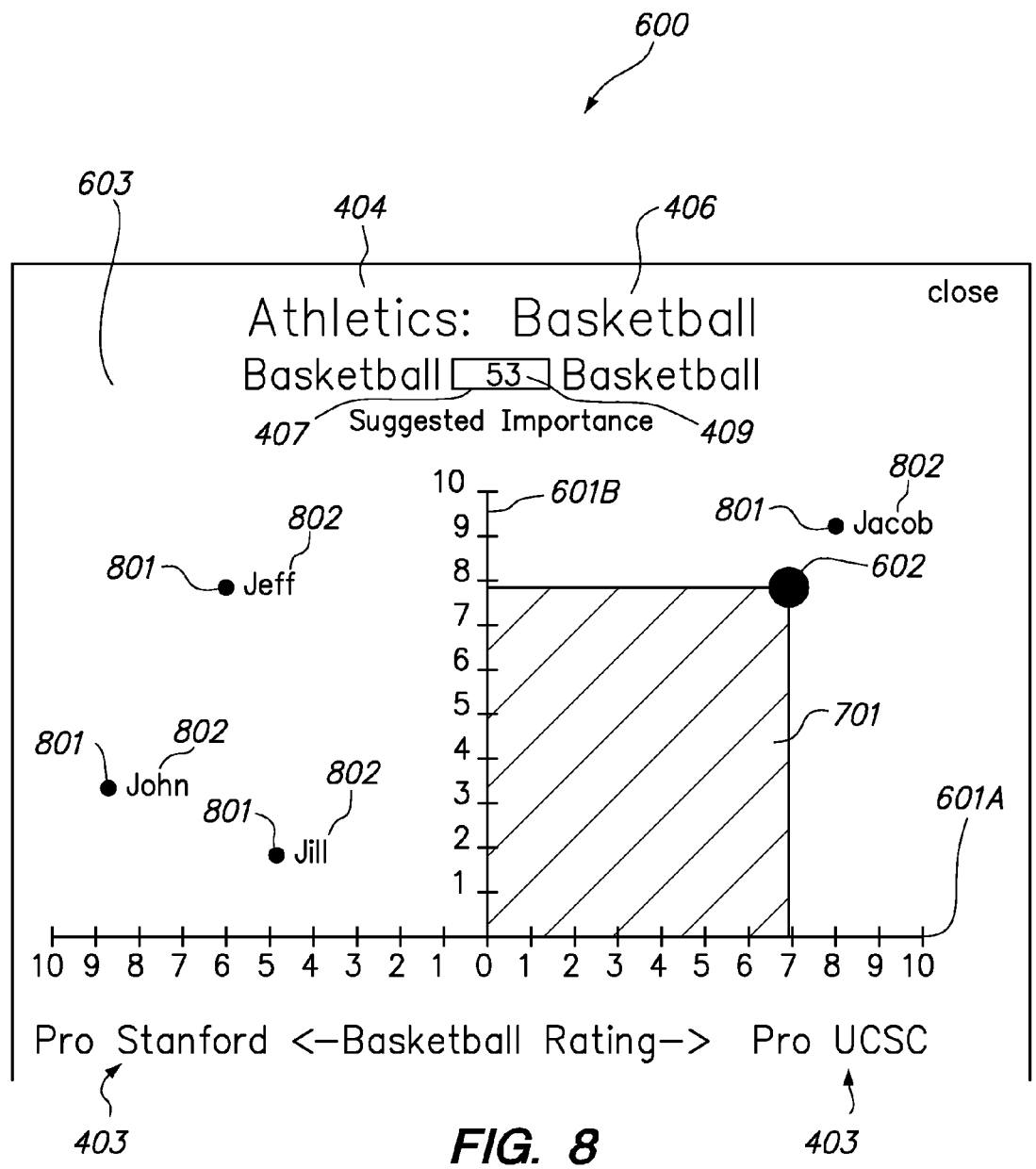
FIG. 8 is an example of a user interface for indicating a weight for a factor, wherein multiple recommendations by different users are represented on a single grid, according to one embodiment.

Referring now to FIG. 8, there is shown an example of a user interface 600 wherein multiple recommendations by different users 102 are represented on a single grid 603. This user interface 600 can be presented to a user 102 so that he or she can see the recommendations of other users 102 while entering his or her own recommendation 102. Indicators 801 are provided for the recommendations of other users 102, with each indicator 801 being shown at a position within the grid 603 to indicate the parameter values associated with that recommendation. In one embodiment, indicators 801 can be shown in a different color than the movable element 602, or having some other visually distinctive characteristic, so as to distinguish them from the movable element 602.

In one embodiment, a label 802 is displayed near each indicator 801, to identify the user 102 that contributed the recommendation. In other embodiments, labels 802 can be omitted, particularly if a large number of indicators 801 are being shown; the user can position a cursor to hover over an indicator 801 to cause a tool-tip to be displayed including a name or other identifier associated with the user 102 that contributed the recommendation. As described above in connection with FIG. 7, the user 102 providing the recommendation can interact with the movable element 602 to provide parameter values for his or her own recommendation; the rectangle 701 is dynamically resized and reshaped in response to the movements of element 602, as described previously.

In one embodiment, providing the ability for users 102 to see recommendations and values submitted by other users 102 facilitates a collaborative forum by which users 102 can engage in dialogue regarding the decision being made. The decision-maker 101 and/or users 102 can use these various opinions as guides, and/or can take a statistical measure such as an average (which may be manually or automatically calculated) to select the value he uses in his analysis. The decision-maker's 101 ultimate decision among choices 403 can become a basis for competition among users 102.

In one embodiment, a visual indicator (not shown) is presented, representing an aggregation (such as an average or median) of the parameter value along each axis 601. The aggregation can be weighted, if desired, according to some measure of the relative credibility of the various individual recommendations. For example, a recommendation from a user 102 that is judged to have a higher level of credibility can be weighted more heavily than a recommendation from another user 102.

In embodiment, the visual indicator for the aggregated recommendation can be presented using a distinct color or other visually distinctive characteristic. A rectangle, similar to the rectangle 701 described above, can be presented for this aggregated recommendation. This visual indicator can be presented to the advice-seeker 101 and/or to other users 102. Users 102 can thereby see the effect of their recommendations on the overall aggregated recommendation.

In one embodiment, the advice-seeker 101 can decide how the various recommendations should be treated and/or aggregated. Thus, the advice-seeker 101 can change any of the provided values, for example to reflect the importance of each factor 406 to him or her, and can even dismiss or discard some recommendations entirely.

Any of the user interfaces 600 described above can be viewed by the advice-seeker 101 so as to view and/or adjust parameter values and factor weights. Thus, for example, the advice-seeker 101 can activate a user interface 600 as shown in FIG. 7 to view parameter values entered by a single user 102, and to adjust the values if desired. Alternatively, the advice-seeker 101 can activate a user interface 600 as shown in FIG. 8 to view parameter values entered by multiple users 102, displayed by indicators 801. In one embodiment, the advice-seeker 101 can adjust parameter values for any of the users 102 by clicking and dragging on the corresponding indicator 801. Alternatively, in another embodiment, the advice-seeker 101 clicks on an indicator 801 to cause it to be replaced by a movable element 602 and to cause a rectangle 701 to be displayed; the user then drags the movable element 602 to the desired position, causing the rectangle 701 to change size and shape according to the new position of the element 602.

In another embodiment, the advice-seeker 101 can specify one (or more) of the parameter values as being fixed and not changeable. For example the advice-seeker 101 might specify that the importance value is fixed at a certain level. Thus, users 102 would be free to move element 602 along the ratings axis 601A but would not be able to move it along the importance axis 601B. According to various embodiments, the advice-seeker 101 can specify any subset of parameter values as being fixed while allowing other parameter values to be changed by users 102. In yet another embodiment, the advice-seeker 101 can indicate that certain "trusted" users 102 be permitted to change a value that other users 102 cannot change.

In another embodiment, the system and method of the present invention can be used to implement a collective decision-making process. Thus, the invention can be used to enable various users 102 to submit their recommendations, and for an ultimate decision to be made based on an aggregation of the users. As described above, the aggregation can be an average or median or some other function, and can be designed to give weight to each recommendation based on its parameter values. In some embodiments, recommendations from different users 102 can be weighted according to, for example, the relative credibility of the users 102.

Variations

One skilled in the art will recognize that the user interface described herein can be applied in other contexts as well. For example, in a non-collaborative environment, an individual making a decision can use such an interface to make decisions in the absence of input from other users. Thus, the present invention can be used to assist in making decisions without necessarily requiring collaborative and/or multi-user input. In such an embodiment, the individual making decisions uses an interface similar to that depicted in FIGS. 7 and 8 to specify values for parameters associated with factors, and can view aggregated factor analysis reports to assist in making the decision.

Figure 9:
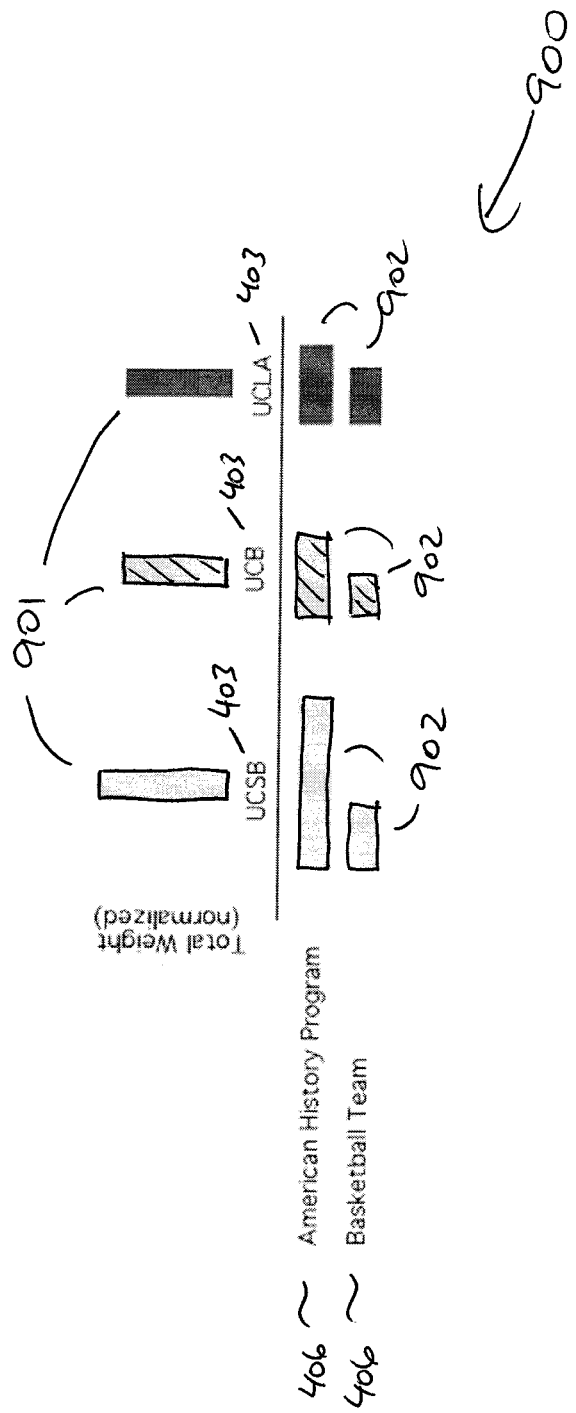
FIG. 9 is an example of a user interface for displaying weights and overall scores for a decision involving three choices.

Referring now to FIG. 9, there is shown an example of a user interface 900 for displaying weights and overall scores for a decision involving three choices 403. The choices 403 in this example are three schools: UCSB, UCB, and UCLA. For each factor 406, an overall weight is generated, represented visually by the length of a horizontal bar 902. In the example, horizontal bars 902 are color-coded to correspond to the choices 403. Each factor 406 is thereby assigned a weight for each choice 403. An overall score for each choice 403 is generated, for example by adding the weights represented by the horizontal bars 902. Each vertical bar 901 is a visual indication of the overall score for the corresponding choice 403, based on the weights assigned to that choice 403.

Variations of the above-described scheme can be used for decisions involving more than two choices. In addition, the rating for each choice can be specified in relative or absolute terms. For instance, in a decision among five possible choices, each can be rated on an absolute scale (such as 1 to 10); alternatively, a relative merit scale can be established wherein a total number of points (such as 50) is made available to be divided among the five choices. In some situations, particularly those involving several choices, it may be advantageous to assign scoring values according to a relative merit scale.

In one embodiment, for each factor 406, a separate grid is shown. In each grid, shapes such as rectangles are displayed, one for each choice 403. The area of each rectangle represents the weight assigned in favor of that choice 403 based on the factor 406 associated with the grid. A movable element 602 is provided, to allow a user 102 to change the size and shape of each rectangle.

In one embodiment, each rectangle has a width and a height corresponding to two different parameter values. Thus, movement of the movable element 602 causes the width and/or height of a rectangle to change, which in turn results in adjustment of one or both of the parameter values. In one embodiment, movement of element 602 can cause a parameter value to change for all of the choices 403 or just for one choice. For example, a parameter value such as "importance" might be configured so that it remains equal for all choices 403; thus a change to a rectangle that causes the parameter value for "importance" to change would affect the sizes of all the rectangles for all the choices 403. On the other hand, a parameter value such as "relative merit" or "rating" might be configured so that it can be changed individually for each choice 403; thus a change to a rectangle that causes the parameter value for "relative merit" to change would not affect the sizes of rectangles for other choices 403.

Figure 10:
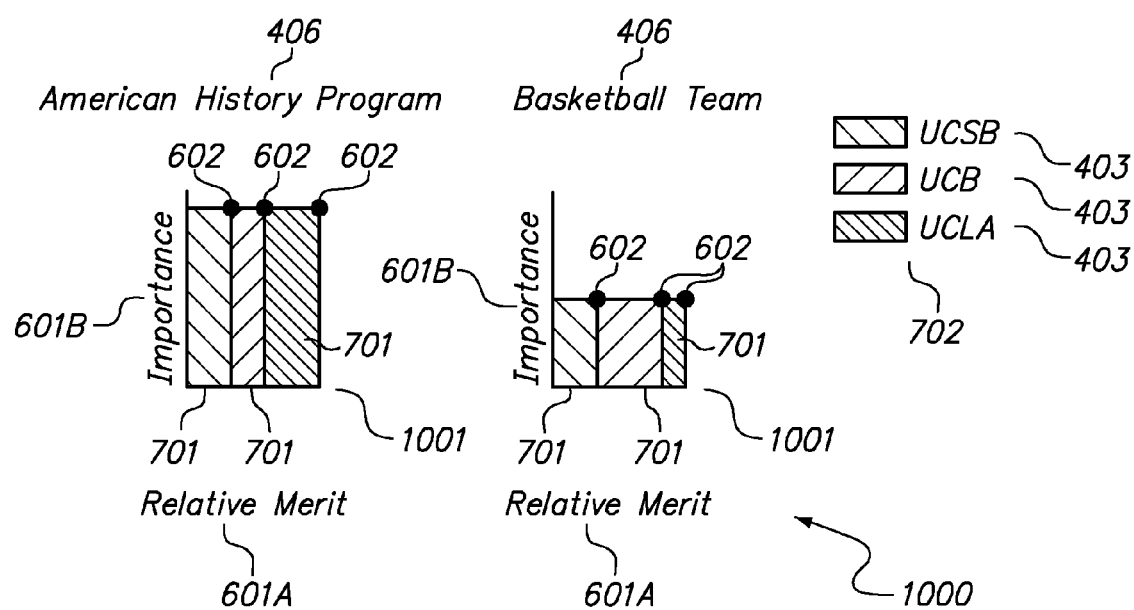
FIG. 10 is an example of a user interface for specifying weights in a decision involving three choices, according to one embodiment.

Referring now to FIG. 10, there is shown an example of a user interface 1000 for specifying weights in a decision involving three choices 403, according to one embodiment. In this example two grids 1001 are shown, corresponding to two factors 406. Any number of grids 1001 can be shown, and the user interface 1000 can be scrollable to allow navigation to grids 1001 that are not currently displayed.

Each grid 1001 has an axis 601A for relative merit (equivalent to rating) and an axis 601B for importance of the factor 406. In each grid 1001, three rectangles 701 are shown, each corresponding to one of the decision choices 403, as denoted by a legend 702. The height of a rectangle 701 indicates the importance of the factor 406 to the decision, and the width of the rectangle 701 indicates the relative merit of each choice 403 when the factor 406 is being considered. Movable elements 602 allow the user 101 to change the dimensions of the rectangles 701 and thereby adjust the values. The overall area of each rectangle 701 represents the weight of the corresponding factor 406 in deciding among the choices 403.

As discussed above, a parameter value such as "importance" can be configured so that it is always equal for all choices 403; thus a change to a rectangle 701 that causes the parameter value for "importance" to change affects the sizes of all the rectangles 701 for all the choices 403. Thus, changes to the importance value cause changes in all of the rectangles 701 to be applied in concert with one another. In the example of FIG. 10, vertical movement of an element 602 causes all rectangles 701 within a grid 1001 to be adjusted to the newly specified height. This reflects the fact that the importance of a particular factor 406 is equal for all choices. However, horizontal movement of an element 602 only adjusts the rectangle 701 for one particular choice 403, and does not affect the size of other rectangles 701. Thus, the relative merit of a particular choice 403 in view of a particular factor 406 is individually specifiable for that choice 403.

Figure 11:
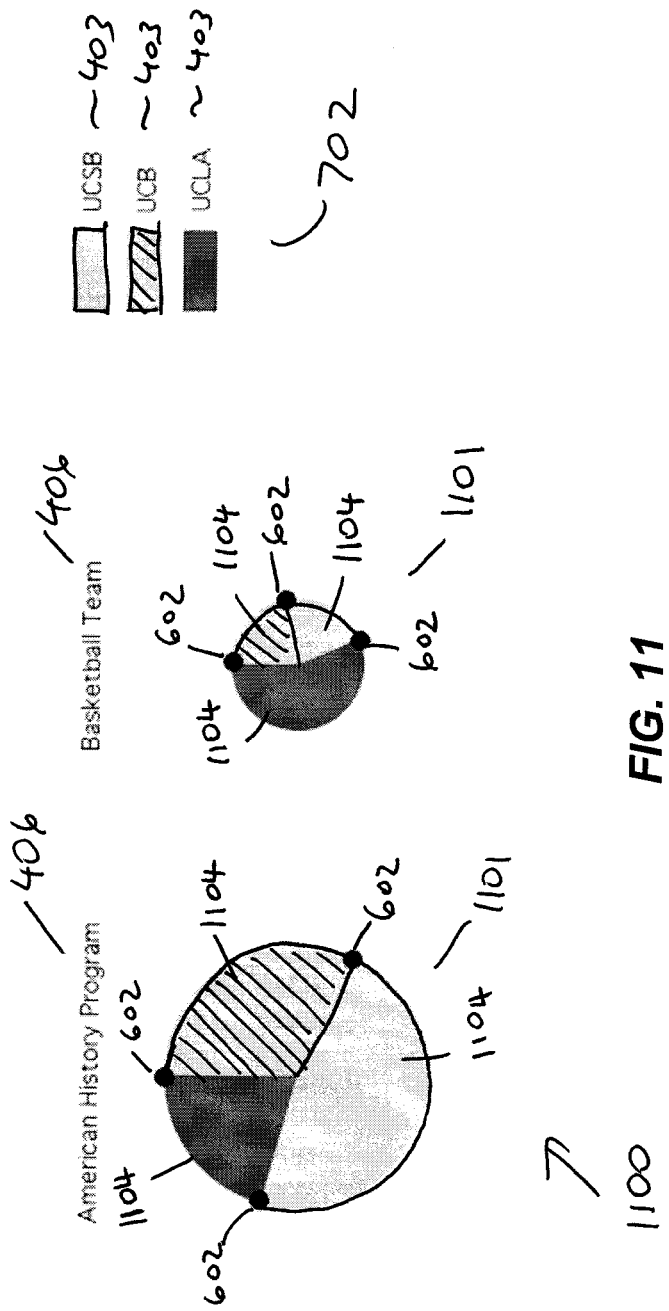
FIG. 11 is an example of a pie-chart user interface for specifying weights in a decision involving three choices, according to one embodiment.

In another embodiment, a circular pie-chart interactive display is presented, wherein the user can adjust the size of the overall pie chart to change the value of a parameter that applies to all choices 403, and/or can adjust the size of individual pie segments to change the value of a parameter that applies to a single choice 403. Referring now to FIG. 11, there is shown an example of such a user interface 1100 for specifying weights in a decision involving three choices 403. In this example two pie charts 1101 are shown, corresponding to two factors 406. Any number of pie charts 1101 can be shown, and the user interface 1100 can be scrollable to allow navigation to pie charts 1101 that are not currently displayed.

The overall size of a pie chart 1101 indicates the importance of the corresponding factor 406. In each pie chart 1101, three pie segments 1104 are shown, each corresponding to one of the decision choices 403, as denoted by a legend 702. The relative size of a pie segment 1104 indicates the relative merit of a choice 403 when the factor 406 is being considered. Movable elements 602 allow the user 101 to change the dimensions of the pie segments 1104 and of the overall pie chart 1101, and thereby adjust the values. Since changes to the overall size of the pie chart 1101 affect all pie segments 1104, the overall size of the pie chart 1101 is ideally suited to represent a factor such as importance, which affects all choices 406 equally.

In the example of FIG. 11, a user 102 can move an element 602 radially outward or inward to adjust the overall size of the pie chart 1101 and thereby change the importance of the factor 406. The user 102 can move an element 602 tangentially to adjust size of an individual pie segment 1104 and thereby specify the relative merit of a choice 403.

In this manner, the area of each pie segment 1104 represents the weight of the corresponding factor 406 in deciding among the choices 403. This area represents a combination of a) the overall size of the pie chart 1101 and b) the relative size of the pie segment 1104 as a percentage of the pie chart 1101.

Figure 12:
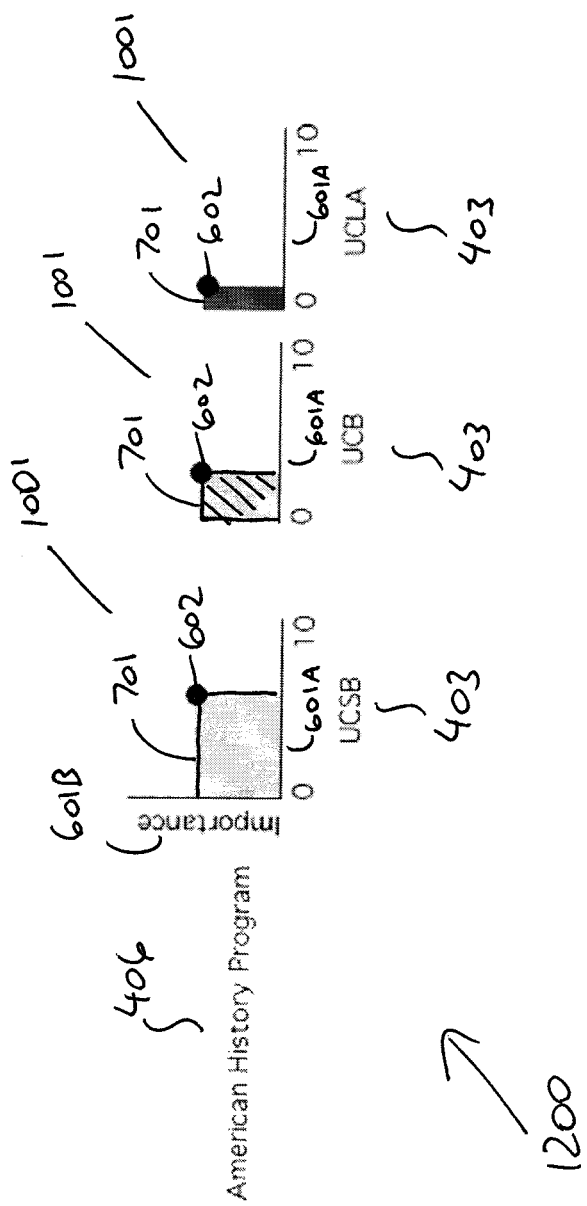
FIG. 12 is an example of a user interface for specifying weights in a decision involving three choices, wherein the user can specify absolute merit for each choice, according to one embodiment.

Referring now to FIG. 12, there is shown an alternative embodiment of a user interface 1200, wherein the user 102 can specify absolute merit for each choice 403. Thus, a merit, or rating, can be specified for each choice 403 independently without affecting merit for other choices 403. In such an interface 1200, importance 601B can be configured to change in concert among all choices 403.

In the example of FIG. 12, three grids 403 are shown for a single factor 406: one for each choice 403. A vertical axis 601B represents the importance of the factor 406, and a horizontal axis 601A represents merit of each choice 403 with respect to the factor 406, on a scale of 0 through 10. Rectangles 701 represent the overall weight of the factor 406 in deciding among the three choices 403. In the example, the user can move elements 602 to adjust the dimensions of the rectangles 701. Adjusting a width causes an adjustment to the relative merit value for the corresponding choice 403 with respect to the factor 406. Adjusting a height causes all of the rectangles 701 to be adjusted in concert with one another, so as to adjust the importance of the factor 406 for all choices 403.

Figure 13:
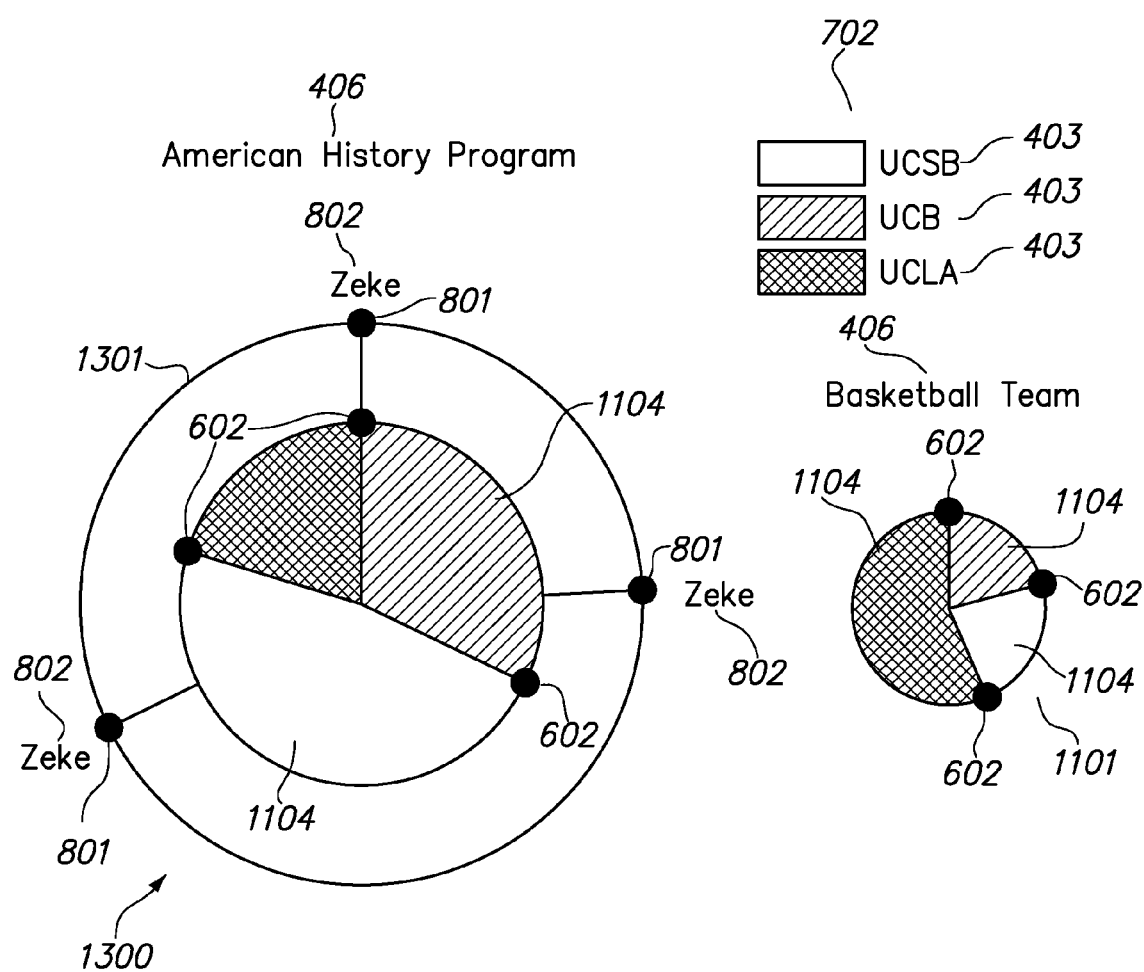
FIG. 13 is an example of a pie-chart user interface for specifying weights in a decision involving three choices, wherein multiple recommendations by different users are represented on a single pie-chart, according to one embodiment.

Referring now to FIG. 13, there is shown a user interface 1300 wherein a user 102 or advice-seeker 101 can see other users' 102 recommendations in the context of a pie chart display. Such an interface 1300 allows a user 102 to compare his or her recommendations with those of other users 102, and can also be the basis for collaborative decision making.

In the example, user interface 1300 is similar to the pie chart interface 1100 discussed above in connection with FIG. 11. Superimposed on one of the pie charts 1101 are indicators 801 representing the recommendations of another users 102, with each indicator 801 being shown at a position on the pie chart 1101 to indicate the parameter values associated with that recommendation. In one embodiment, the indicators 801 can be shown in a different color than the movable element 602, or having some other visually distinctive characteristic, so as to distinguish them from the movable element 602. In one embodiment, the user can cause the indicators 801 to be shown or dismissed as desired, for example by clicking on a command or performing some other input action. In the example, indicators 801 are shown for the pie chart 1101 associated with one of the factors 406 ("American History Program") but are omitted for the pie chart 1101 associated with the other factor 406 ("Basketball Team").

Figure 14A:
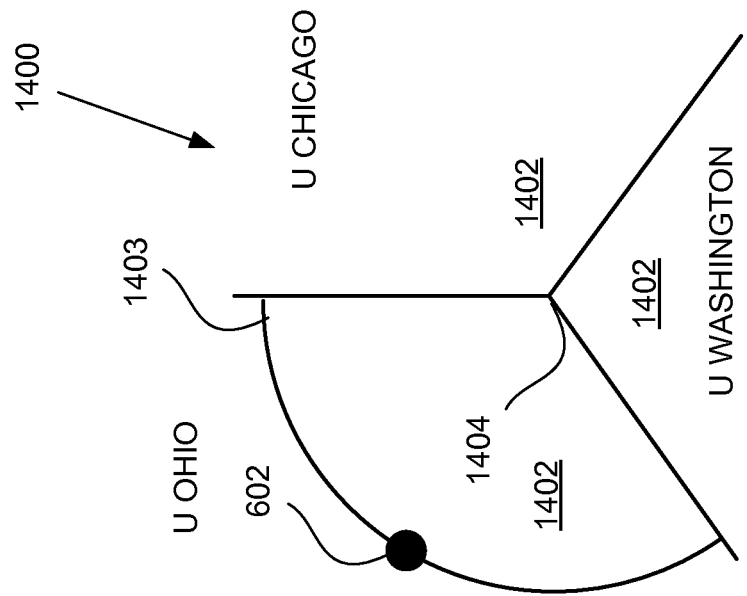
FIGS. 14A through 14C depict an example of a user interface for specifying weights among three choices, according to one embodiment.
Figure 14B:
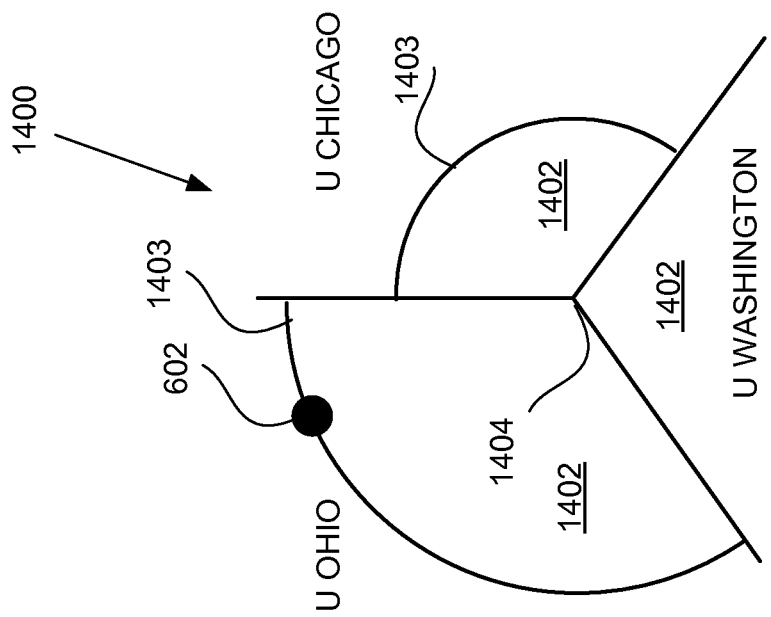
Figure 14C:
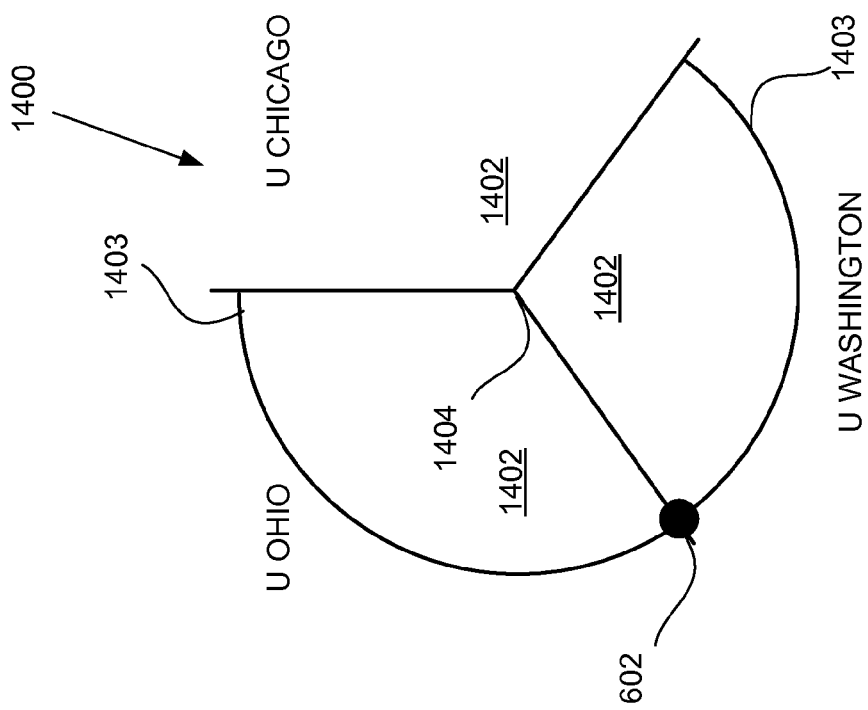

Referring now to FIGS. 14A through 14C, there is shown an example of a user interface 1400 for specifying weights among three choices, according to one embodiment. In this embodiment, a circle (not shown) having origin 1404 is divided into three pie segments 1402 subtending equal angles (120 degrees each) corresponding to each of the three choices. In the example, the three choices correspond to U OHIO, U CHICAGO, and U WASHINGTON. User 102 can drag movable point 602 to any point along the circle, and can drag movable point 602 towards or away from origin 1404 to indicate the relative importance of the factor.

The angular position of movable point 602 with respect to origin 1404 simultaneously determines the weights accorded to the three choices. If the angular coordinate of movable point 602 with respect to origin 1404 corresponds to the middle of a pie segment 1402, the choice corresponding to that segment 1402 is assigned a non-zero weight and the other two choices are assigned a weight of zero. As movable point 602 moves towards an adjoining segment 1402, the choice corresponding to that adjoining segment 1402 is assigned a non-zero weight based on the proximity of movable point 602 to the adjoining segment 1402. When movable point 602 is at a boundary between adjoining segments 1402, the choices corresponding to those segments 1402 are assigned equal, non-zero weights, while the remaining segment 1402 is assigned a weight of zero.

The distance of movable point 602 from origin 1404 specifies the relative importance of the factor.

In FIG. 14B, the angular coordinate of movable point 602 with respect to origin 1404 corresponds to the middle of the U OHIO pie segment 1402. Thus, U OHIO is assigned a non-zero weight and the other two choices (U CHICAGO and U WASHINGTON) are assigned a weight of zero. Arc 1403 is displayed within the pie segment 1402 corresponding to U OHIO, to indicate the non-zero weight assigned to that choice. The radius of arc 1403 is specified by the distance of movable point 602 from origin 1404, so as to indicate the relative importance of the factor. No arc is displayed within the other two pie segments 1402.

In FIG. 14A, movable point 602 has been moved closer to the U CHICAGO pie segment 1402. Thus, U CHICAGO is assigned a non-zero weight based on the proximity of movable point 602 to the U CHICAGO pie segment 1402. Arc 1403 is displayed within the U CHICAGO pie segment 1402, although it is given a smaller radius than the arc 1403 displayed within the U OHIO pie segment 1402, so as to indicate that the weight assigned to U CHICAGO is smaller than the weight assigned to U OHIO. No arc is displayed within the U WASHINGTON pie segment 1402.

In FIG. 14C, movable point 602 is at a boundary between the U OHIO and U WASHINGTON pie segments 1402. Here, U OHIO and U WASHINGTON are assigned equal, non-zero weights, while the U CHICAGO pie segment 1402 is assigned a weight of zero. Arcs 1403 of equal radius are displayed within the U OHIO and U WASHINGTON pie segments 1402. No arc is displayed within the U CHICAGO pie segment 1402.

In this manner, a visual indication of relative weights is presented. Since the distance of movable point 602 from origin 1404 specifies the relative importance of the factor, the overall weight assigned to each choice is represented by the area of the pie-shaped segment defined by the position of movable point 602.

In various embodiments, the present invention can be implemented as a system or a method for performing the above-described techniques, either singly or in any combination. In another embodiment, the present invention can be implemented as a computer program product comprising a computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared, transformed, and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise one or more general-purpose computer(s) selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers and/or other electronic devices referred to in the specification may include a single processor or may be architectures employing multiple processor designs for increased computing capability. In one embodiment, some or all of the functional components described above are implemented as computer hardware including processors performing the above-described steps under the control of software.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

Accordingly, in various embodiments, the present invention can be implemented as software, hardware, or other elements for controlling a computer system, computing device, or other electronic device, or client/server architecture, or any combination or plurality thereof. Hardware for implementing the system of the present invention can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention (or components of the invention) include: a mobile phone, personal digital assistant, smartphone, kiosk, desktop computer, laptop computer, consumer electronic device, television, set-top box, or the like. An electronic device for implementing the present invention may use an operating system such as, for example, Microsoft Windows Vista available from Microsoft Corporation of Redmond, Wash., or any other operating system that is adapted for use on the device.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

While the invention has been particularly shown and described with reference to a preferred embodiment and several alternate embodiments, it will be understood by persons skilled in the relevant art that various changes in form and details can be made therein without departing from the spirit and scope of the invention.

What is claimed is:

1. In a computer-implemented system including an input device, an output device, and a processor, a method for receiving input specifying at least two parameter values for determining a weight of a factor for making a decision among at least two choices, the method comprising:
   on the output device:
      displaying a grid comprising at least two axes, each axis corresponding to a parameter for determining a weight of the factor;
      displaying, for each of the at least two choices, a movable control element at an initial position on the grid, the initial position having a position along a first axis of the grid and a position along a second axis of the grid, wherein all of the movable control elements have the same position along the second axis of the grid; and
      displaying, for each of the at least two choices, a rectangle representing a factor weight, the rectangle having dimensions determined by the position of the movable control element corresponding to the choice;
   receiving user input via the input device to move one of the movable control elements to a new position;
   responsive to the user input indicating a change to the position of the movable control element along the first axis, moving the movable control element on the output device along the first axis by an amount indicated by the user input;
   responsive to the user input indicating a change to the position of the movable control element along the second axis, moving all of the movable control elements on the output device along the second axis by an amount indicated by the user input;
   on the output device, for each moved control element, adjusting the dimensions of the rectangle corresponding to the control element in accordance with the new position of the control element; and
   at the processor:
      for each of the at least two choices, determining a value for a first parameter based on the new position of the movable control element along the first axis;
      for each of the at least two choices, determining a value for a second parameter based on the new position of the movable control element along the second axis;
      for each of the at least two choices, determining a value for the factor weight based on a mathematical function combining the first and second parameter values; and
      for each of the at least two choices, assigning the factor weight to the factor.

2. The method of claim 1, wherein determining a value for the factor weight comprises determining a mathematical product of the first and second parameter values.

3. The method of claim 1, wherein:
   the first parameter comprises a metric representing the merit of at least one of the choices with respect to the factor; and
   the second parameter comprises a metric representing the importance of the factor with respect to the decision.

4. In a computer-implemented system including an input device, an output device, and a processor, a method for receiving input specifying at least two parameter values for determining a weight of a factor for making a decision among at least two choices, the method comprising:
   on the output device:
      displaying a pie chart comprising a circle having an overall size corresponding to a first parameter for determining a weight of the factor, the pie chart comprising at least two angularly defined segments disposed within the circle, each segment corresponding to one of the at least two choices, each segment having a relative size corresponding to a second parameter for determining a weight of the factor; and
      displaying, for each of the at least two choices, a movable control element at an initial position on the circumference of the circle, the position of the movable control element corresponding to and defining a radial boundary between the segment corresponding to the choice and a segment corresponding to another choice;
   receiving user input via the input device to move one of the movable control elements to a new position;
   responsive to the user input indicating a change to the position of the movable control element in a direction tangential to the circumference of the circle, moving the movable control element on the output device according to the user input and changing the position of the radial boundary defined by the movable control element;
   responsive to the user input indicating a change to the position of the movable control element in a radial direction with respect to the circle, moving the movable control element on the output device according to the user input and changing the size of the circle according to the changed position of the movable control element; and
   at the processor:
      for each of the at least two choices, determining a value for a first parameter based on the new relative size of the segment corresponding to the choice;
      for each of the at least two choices, determining a value for a second parameter based on the new overall size of the circle;
      for each of the at least two choices, determining a value for the factor weight based on a mathematical function combining the first and second parameter values; and
      for each of the at least two choices, assigning the factor weight to the factor.

5. The method of claim 4, wherein:
the first parameter comprises a metric representing the merit of at least one of the choices with respect to the factor; and
the second parameter comprises a metric representing the importance of the factor with respect to the decision.

6. In a computer-implemented system including an input device, an output device, and a processor, a method for determining a weight of a factor for making a decision among at least two choices, the method comprising:
on the output device:
displaying at least two grids, each grid comprising at least two axes, each axis corresponding to a parameter for determining a weight of the factor;
displaying, for each grid, a movable control element at an initial position on the grid, the initial position having a position along a first axis of the grid and a position along a second axis of the grid, wherein all of the movable control elements have the same position along the second axis of their respective grids; and
displaying, for each grid, a rectangle representing a factor weight, the rectangle having dimensions determined by the position of the movable control element corresponding to the grid;
receiving user input via the input device to move one of the movable control elements to a new position, the moved control element corresponding to one of the grids;
responsive to the user input indicating a change to the position of the movable control element along the first axis of the grid corresponding to the movable control element, moving the movable control element on the output device along the first axis of the grid corresponding to the movable control element by an amount indicated by the user input;
responsive to the user input indicating a change to the position of the movable control element along the second axis of the grid corresponding to the movable control element, moving all of the movable control elements on the output device along the second axis of their respective grids by an amount indicated by the user input;
on the output device, adjusting, for each grid, the dimensions of the rectangle corresponding to the grid in accordance with the new position of the control element; and
at the processor:
for each of the at least two choices, determining a value for a first parameter based on the new position of the movable control element along the first axis of the grid corresponding to the choice;
for each of the at least two choices, determining a value for a second parameter based on the new position of the movable control element along the second axis of the grid corresponding to the choice;
for each of the at least two choices, determining a value for the factor weight based on a mathematical function combining the first and second parameter values; and
for each of the at least two choices, assigning the factor weight to the factor.

7. The method of claim 6, wherein:
for each choice, the first parameter comprises a metric representing the merit of the choice with respect to the factor; and
the second parameter comprises a metric representing the importance of the factor with respect to the decision.

8. In a first client machine communicatively coupled to a server and including an input device, an output device, and a processor, a method for receiving input specifying at least one parameter value for determining a weight of a factor for making a decision among at least two choices, the method comprising:
displaying, on the output device, a decision question retrieved from a forum implemented at the server where the decision question has previously been received from a second client machine and posted on the forum by an advice-seeker operating the second client machine;
receiving user input selecting the decision question and selecting a factor for the decision question;
receiving user input to move a movable control element;
displaying, on the output device, a grid comprising at least two axes, each axis corresponding to a parameter for determining a weight of the factor;
displaying, on the output device, the movable control element at an initial position on the grid, the initial position having a horizontal coordinate and a vertical coordinate with respect to the grid;
responsive to the user input, moving the movable control element on the output device to a new position on the grid, the new position having a horizontal coordinate and a vertical coordinate with respect to the grid;
displaying, on the output device, a rectangle representing a factor weight, the rectangle having a width determined by the horizontal coordinate of the new position of the movable control element, the rectangle having a height determined by the vertical coordinate of the new position of the movable control element;
at the processor:
determining a value for a first parameter based on the horizontal coordinate of the new position of the movable control element;
determining a value for a second parameter based on the vertical coordinate of the new position of the movable control element;
determining a value for the factor weight based on a mathematical function combining the first and second parameter values; and
assigning the factor weight to the factor; and
transmitting, to the server, a signal representing the factor weight to cause the server to store a representation of the factor weight.

9. The method of claim 8, further comprising displaying, on an output device associated with the second client machine, the representation of the factor weight.

10. The method of claim 9, further comprising, at the second client machine:
receiving user input adjusting the factor weight; and
transmitting, to the server, a signal representing the adjusted factor weight.

11. The method of claim 9, further comprising:
displaying, on an output device associated with the second client machine, a grid comprising at least two axes, each axis corresponding to a parameter for determining a weight of the factor;
displaying, on the output device associated with the second client machine, the movable control element at the new position on the grid;
at the second client machine, receiving user input to move the movable control element;
at the second client machine, responsive to the user input, moving the movable control element on the output device to an adjusted position on the grid, the adjusted position having a horizontal coordinate and a vertical coordinate with respect to the grid;

displaying, on the output device associated with the second client machine, a rectangle representing a factor weight, the rectangle having a width determined by the horizontal coordinate of the adjusted position of the movable control element, the rectangle having a height determined by the vertical coordinate of the adjusted position of the movable control element;

at a processor associated with the second client machine:
determining a value for a first parameter based on the horizontal coordinate of the adjusted position of the movable control element;
determining a value for a second parameter based on the vertical coordinate of the adjusted position of the movable control element;
determining an adjusted value for the factor weight based on a mathematical function combining the first and second parameter values; and
assigning the adjusted factor weight to the factor; and
transmitting, from the second client machine to the server, a signal representing the adjusted factor weight.

12. In a computer-implemented system including an input device, an output device, and a processor, a method for receiving input specifying at least two parameter values for determining a weight of a factor for making a decision among at least three choices, the method comprising:
on the output device:
displaying a pie chart comprising at least three angularly defined segments, the pie chart having an origin, each segment corresponding to one of the at least three choices;
displaying a movable control element at a distance from the origin and at an angular position around the origin, the distance representing an overall importance for the factor and the angular position representing the merit of at least one of the choices with respect to the factor; and
displaying an arc within a segment containing the movable control element, the arc having a radius corresponding to the distance of the movable control element from the origin;
receiving user input to move the movable control element to a new position;
responsive to the user input, moving the movable control element on the output device; and
at the processor:
determining an overall importance for the factor based on the new distance of the movable control element from the origin;
determining a merit of at least one of the choices with respect to the factor based on the new angular position of the movable control element around the origin;
for at least one of the choices, determining a factor weight based on a mathematical function combining overall importance and merit; and
for at least one of the choices, assigning the factor weight to the factor.

13. The method of claim 12, wherein determining a merit of at least one of the choices with respect to the factor comprises:
responsive to the angular position of the movable control element corresponding to a midpoint of a first segment, assigning a non-zero merit value to the choice corresponding to the first segment and assigning a merit value of zero to the remaining choices;
responsive to the angular position of the movable control element corresponding to a boundary between a first segment and a second segment, assigning equal non-zero merit values to the choices corresponding to the first and second segments, and assigning a merit value of zero to the at least one remaining choice; and
responsive to the angular position of the movable control element corresponding to a position within a first segment and closer to a second segment than to a third segment:
assigning a first non-zero merit value to the choice corresponding to the first segment;
assigning a second non-zero merit value to the choice corresponding to the second segment, wherein the second non-zero merit value is smaller than the first non-zero merit value, and wherein the second non-zero merit value is determined by the proximity of the movable control element to the second segment; and
assigning a merit value of zero to the at least one remaining choice.

14. The method of claim 13, further comprising:
responsive to the angular position of the movable control element corresponding to a midpoint of a first segment, displaying, on the output device, an arc within the first segment, the arc having a radius determined by the distance of the movable control element from the origin;
responsive to the angular position of the movable control element corresponding to a boundary between a first segment and a second segment, displaying, on the output device, an arc within the first segment and an arc within the second segment, each arc having a radius determined by the distance of the movable control element from the origin; and
responsive to the angular position of the movable control element corresponding to a position within a first segment and closer to a second segment than to a third segment:
displaying, on the output device, an arc within the first segment, the arc having a radius determined by the distance of the movable control element from the origin; and
displaying, on the output device, an arc within the second segment, the arc having a radius determined by the distance of the movable control element from the origin and further determined by the proximity of the movable control element to the second segment.

15. In a computer-implemented system including an input device, an output device, and a processor, a method of receiving input specifying at least two parameter values for determining a weight of a factor for making a decision, the method comprising:
on the output device, displaying a movable control element at an initial position, the initial position having at least two coordinates, each coordinate corresponding to a parameter for determining a weight of the factor;
on the output device, displaying at least one indicator at a position indicating a factor weight specified by a first user, the at least one indicator having a first coordinate indicating a value for the first parameter specified by the first user, the at least one indicator having a second coordinate indicating a value for the second parameter specified by the first user;
receiving user input from a second user via the input device to move the movable control element;
responsive to the user input from the second user, moving the movable control element to a new position, the new position having at least two coordinates;
on the output device, displaying a visual representation of a factor weight, the visual representation having attributes determined by the coordinates of the new position of the movable control element;

at the processor, determining a value for a first parameter based on a first coordinate of the new position of the movable control element;

at the processor, determining a value for a second parameter based on a second coordinate of the new position of the movable control element;

at the processor, determining a value for the factor weight based on a mathematical function combining the first and second parameter values; and at the processor, assigning the factor weight to the factor.

16. The method of claim 15, further comprising, on the output device, displaying a label indicating the identity of the first user.

17. A computer program product for receiving input specifying at least two parameter values for determining a weight of a factor for making a decision among at least two choices, the computer program product comprising:

a non-transitory computer-readable storage medium; and computer program code, encoded on the medium, configured to cause at least one processor to perform the steps of:

causing an output device to perform the steps of:

displaying a grid comprising at least two axes, each axis corresponding to a parameter for determining a weight of the factor;

displaying, for each of the at least two choices, a movable control element at an initial position on the grid, the initial position having a position along a first axis of the grid and a position along a second axis of the grid, wherein all of the movable control elements have the same position along the second axis of the grid; and displaying, for each of the at least two choices, a rectangle representing a factor weight, the rectangle having dimensions determined by the position of the movable control element corresponding to the choice;

causing a user input device to be receptive to user input to move one of the movable control elements to a new position;

responsive to the user input indicating a change to the position of the movable control element along the first axis, causing the output device to move the movable control element along the first axis by an amount indicated by the user input:

responsive to the user input indicating a change to the position of the movable control element along the second axis, causing the output device to move all of the movable control elements along the second axis by an amount indicated by the user input;

causing the output device to adjust, for each moved control element, the dimensions of the rectangle corresponding to the control element in accordance with the new position of the control element;

for each of the at least two choices, determining a value for a first parameter based on the new position of the movable control element along the first axis;

for each of the at least two choices, determining a value for a second parameter based on the new position of the movable control element along the second axis;

for each of the at least two choices, determining a value for the factor weight based on a mathematical function combining the first and second parameter values; and for each of the at least two choices, assigning the factor weight to the factor.

18. The computer program product of claim 17, wherein the computer program code configured to cause at least one processor to perform the step of determining a value for the factor weight comprises computer program code configured to cause at least one processor to determine a mathematical product of the first and second parameter values.

19. The computer program product of claim 17, wherein:

the first parameter comprises a metric representing the merit of at least one of the choices with respect to the factor; and the second parameter comprises a metric representing the importance of the factor with respect to the decision.

20. A computer program product for receiving input specifying at least two parameter values for determining a weight of a factor for making a decision among at least two choices, the computer program product comprising:

a non-transitory computer-readable storage medium; and computer program code, encoded on the medium, configured to cause at least one processor to perform the steps of:

causing an output device to perform the steps of:

displaying a pie chart comprising a circle having an overall size corresponding to a first parameter for determining a weight of the factor, the pie chart comprising at least two angularly defined segments disposed within the circle, each segment corresponding to one of the at least two choices, each segment having a relative size corresponding to a second parameter for determining a weight of the factor;

displaying, for each of the at least two choices, a movable control element at an initial position on the circumference of the circle, the position of the movable control element corresponding to and defining a radial boundary between the segment corresponding to the choice and a segment corresponding to another choice;

causing a user input device to be receptive to user input to move one of the movable control elements to a new position;

responsive to the user input indicating a change to the position of the movable control element in a direction tangential to the circumference of the circle, causing the output device to move the movable control element according to the user input and to change the position of the radial boundary defined by the movable control element;

responsive to the user input indicating a change to the position of the movable control element in a radial direction with respect to the circle, causing the output device to move the movable control element according to the user input and to change the size of the circle according to the changed position of the movable control element;

for each of the at least two choices, determining a value for a first parameter based on the new relative size of the segment corresponding to the choice;

for each of the at least two choices, determining a value for a second parameter based on the new overall size of the circle;

for each of the at least two choices, determining a value for the factor weight based on a mathematical function combining the first and second parameter values; and for each of the at least two choices, assigning the factor weight to the factor.

21. The computer program product of claim 20, wherein:
the first parameter comprises a metric representing the merit of at least one of the choices with respect to the factor; and
the second parameter comprises a metric representing the importance of the factor with respect to the decision.

22. A computer program product for determining a weight of a factor for making a decision among at least two choices, the computer program product comprising:
a non-transitory computer-readable storage medium; and
computer program code, encoded on the medium, configured to cause at least one processor to perform the steps of:
causing an output device to perform the steps of:
displaying at least two grids, each grid comprising at least two axes, each axis corresponding to a parameter for determining a weight of the factor;
displaying, for each grid, a movable control element at an initial position on the grid, the initial position having a position along a first axis of the grid and a position along a second axis of the grid, wherein all of the movable control elements have the same position along the second axis of their respective grids; and
displaying, for each grid, a rectangle representing a factor weight, the rectangle having dimensions determined by the position of the movable control element corresponding to the grid;
causing a user input device to be receptive to user input to move one of the movable control elements to a new position, the moved control element corresponding to one of the grids;
responsive to the user input indicating a change to the position of the movable control element along the first axis of the grid corresponding to the movable control element, causing the output device to move the movable control element along the first axis of the grid corresponding to the movable control element by an amount indicated by the user input;
responsive to the user input indicating a change to the position of the movable control element along the second axis of the grid corresponding to the movable control element, causing the output device to move all of the movable control elements along the second axis of their respective grids by an amount indicated by the user input;
causing the output device to adjust, for each grid, the dimensions of the rectangle corresponding to the grid in accordance with the new position of the control element;
for each of the at least two choices, determining a value for a first parameter based on the new position of the movable control element along the first axis of the grid corresponding to the choice;
for each of the at least two choices, determining a value for a second parameter based on the new position of the movable control element along the second axis of the grid corresponding to the choice;
for each of the at least two choices, determining a value for the factor weight based on a mathematical function combining the first and second parameter values; and
for each of the at least two choices, assigning the factor weight to the factor.

23. The computer program product of claim 22, wherein:
for each choice, the first parameter comprises a metric representing the merit of the choice with respect to the factor; and
the second parameter comprises a metric representing the importance of the factor with respect to the decision.

24. A computer program product for receiving input specifying at least one parameter value for determining a weight of a factor for making a decision among at least two choices, comprising: a non-transitory computer-readable storage medium; and
computer program code, encoded on the medium, configured to cause at least one processor of a first client machine communicatively coupled to a server to perform the steps of:
causing an output device to display a decision question retrieved from a forum implemented at the server where the decision question has previously been received from a second client machine and posted on the forum by an advice-seeker operating the second client machine;
causing a user input device to be receptive to user input selecting the decision question and selecting a factor for the decision question;
causing a user input device to be receptive to user input to move a movable control element;
causing the output device to display a grid comprising at least two axes, each axis corresponding to a parameter for determining a weight of the factor;
causing the output device to display the movable control element at an initial position on the grid, the initial position having a horizontal coordinate and a vertical coordinate with respect to the grid;
responsive to the user input, causing the output device to move the movable control element to a new position on the grid, the new position having a horizontal coordinate and a vertical coordinate with respect to the grid;
causing the output device to display a rectangle representing a factor weight, the rectangle having a width determined by the horizontal coordinate of the new position of the movable control element, the rectangle having a height determined by the vertical coordinate of the new position of the movable control element;
determining a value for a first parameter based on the horizontal coordinate of the new position of the movable control element;
determining a value for a second parameter based on the vertical coordinate of the new position of the movable control element;
determining a value for the factor weight based on a mathematical function combining the first and second parameter values;
assigning the factor weight to the factor; and
transmitting, to the server, a signal representing the factor weight to cause the server to store a representation of the factor weight.

25. The computer program product of claim 24, further comprising computer program code, encoded on the medium, configured to cause an output device on the second client machine to display the representation of the factor weight.

26. The computer program product of claim 25, further comprising computer program code, encoded on the medium, configured to cause at least one processor of the second client machine to perform the steps of:
causing a user input device to be receptive to user input adjusting the factor weight; and transmitting, to the server, a signal representing the adjusted factor weight.

27. The computer program product of claim 25, further comprising computer program code, encoded on the medium, configured to cause at least one processor of the second client machine to perform the steps of:
   causing an output device associated with the second client machine to display a grid comprising at least two axes, each axis corresponding to a parameter for determining a weight of the factor;
   causing the output device associated with the second client machine to display the movable control element at the new position on the grid;
   causing a user input device associated with the second client machine to be receptive to user input to move the movable control element;
   responsive to the user input, causing the output device associated with the second client machine to move the movable control element on the output device to an adjusted position on the grid, the adjusted position having a horizontal coordinate and a vertical coordinate with respect to the grid;
   causing the output device associated with the second client machine to display a rectangle representing a factor weight, the rectangle having a width determined by the horizontal coordinate of the adjusted position of the movable control element, the rectangle having a height determined by the vertical coordinate of the adjusted position of the movable control element;
   determining a value for a first parameter based on the horizontal coordinate of the adjusted position of the movable control element;
   determining a value for a second parameter based on the vertical coordinate of the adjusted position of the movable control element;
   determining an adjusted value for the factor weight based on a mathematical function combining the first and second parameter values;
   assigning the adjusted factor weight to the factor; and
   transmitting, from the second client machine to the server, a signal representing the adjusted factor weight.

28. A computer program product for receiving input specifying at least two parameter values for determining a weight of a factor for making a decision among at least three choices, the computer program product comprising:
   a non-transitory computer-readable storage medium; and
   computer program code, encoded on the medium, configured to cause at least one processor to perform the steps of:
      causing an output device to perform the steps of:
         displaying a pie chart comprising at least three angularly defined segments, the pie chart having an origin, each segment corresponding to one of the at least three choices;
         displaying a movable control element at a distance from the origin and at an angular position around the origin, the distance representing an overall importance for the factor and the angular position representing the merit of at least one of the choices with respect to the factor; and
         displaying an arc within a segment containing the movable control element, the arc having a radius corresponding to the distance of the movable control element from the origin;
      causing a user input device to be receptive to user input to move the movable control element to a new position;
      responsive to the user input, causing the output device to move the movable control element;
      determining an overall importance for the factor based on the new distance of the movable control element from the origin;
      determining a merit of at least one of the choices with respect to the factor based on the new angular position of the movable control element around the origin;
      for at least one of the choices, determining a factor weight based on a mathematical function combining overall importance and merit; and
      for at least one of the choices, assigning the factor weight to the factor.

29. The computer program product of claim 28, wherein the computer program code configured to cause at least one processor to perform the step of determining a merit of at least one of the choices with respect to the factor comprises computer program code configured to cause at least one processor to perform the steps of:
   responsive to the angular position of the movable control element corresponding to a midpoint of a first segment, assigning a non-zero merit value to the choice corresponding to the first segment and assigning a merit value of zero to the remaining choices;
   responsive to the angular position of the movable control element corresponding to a boundary between a first segment and a second segment, assigning equal non-zero merit values to the choices corresponding to the first and second segments, and assigning a merit value of zero to the at least one remaining choice; and
   responsive to the angular position of the movable control element corresponding to a position within a first segment and closer to a second segment than to a third segment:
      assigning a first non-zero merit value to the choice corresponding to the first segment;
      assigning a second non-zero merit value to the choice corresponding to the second segment, wherein the second non-zero merit value is smaller than the first non-zero merit value, and wherein the second non-zero merit value is determined by the proximity of the movable control element to the second segment; and
      assigning a merit value of zero to the at least one remaining choice.

30. The computer program product of claim 29, further comprising computer program code, encoded on the medium, configured to cause at least one processor to perform the steps of:
   responsive to the angular position of the movable control element corresponding to a midpoint of a first segment, causing the output device to display an arc within the first segment, the arc having a radius determined by the distance of the movable control element from the origin;
   responsive to the angular position of the movable control element corresponding to a boundary between a first segment and a second segment, causing the output device to display an arc within the first segment and an arc within the second segment, each arc having a radius determined by the distance of the movable control element from the origin; and
   responsive to the angular position of the movable control element corresponding to a position within a first segment and closer to a second segment than to a third segment:

causing the output device to display an arc within the first segment, the arc having a radius determined by the distance of the movable control element from the origin; and causing the output device to display an arc within the second segment, the arc having a radius determined by the distance of the movable control element from the origin and further determined by the proximity of the movable control element to the second segment.

31. A computer program product for receiving input specifying at least two parameter values for determining a weight of a factor for making a decision, the computer program product comprising:

a non-transitory computer-readable storage medium; and computer program code, encoded on the medium, configured to cause at least one processor to perform the steps of:

causing an output device to perform the steps of:

displaying a movable control element at an initial position, the initial position having at least two coordinates, each coordinate corresponding to a parameter for determining a weight of the factor;

displaying at least one indicator at a position indicating a factor weight specified by a first user, the at least one indicator having a first coordinate indicating a value for the first parameter specified by the first user, the at least one indicator having a second coordinate indicating a value for the second parameter specified by the first user;

causing a user input device to be receptive to user input from a second user to move the movable control element;

responsive to the user input from the second user, causing the output device to move the movable control element to a new position, the new position having at least two coordinates;

causing the output device to display a visual representation of a factor weight, the visual representation having attributes determined by the coordinates of the new position of the movable control element;

determining a value for a first parameter based on a first coordinate of the new position of the movable control element;

determining a value for a second parameter based on a second coordinate of the new position of the movable control element;

determining a value for the factor weight based on a mathematical function combining the first and second parameter values; and assigning the factor weight to the factor.

32. The computer program product of claim 31, further comprising computer program code configured to cause the output device to display a label indicating the identity of the first user.

* * * * *